(12) United States Patent
Liang et al.

(10) Patent No.: US 12,050,633 B2
(45) Date of Patent: Jul. 30, 2024

(54) DATA PROCESSING METHOD AND APPARATUS

(71) Applicant: Huawei Technologies Co., Ltd., Shenzhen (CN)

(72) Inventors: Wenxiu Liang, Shenzhen (CN); Kaiji Chen, Nanjing (CN); Wenlong Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 17/637,362

(22) PCT Filed: Aug. 6, 2020

(86) PCT No.: PCT/CN2020/107291
§ 371 (c)(1),
(2) Date: Feb. 22, 2022

(87) PCT Pub. No.: WO2021/031862
PCT Pub. Date: Feb. 25, 2021

(65) Prior Publication Data
US 2022/0292122 A1    Sep. 15, 2022

(30) Foreign Application Priority Data
Aug. 21, 2019  (CN) .......................... 201910776210.2

(51) Int. Cl.
*G06F 16/33* (2019.01)
(52) U.S. Cl.
CPC ............................. *G06F 16/3344* (2019.01)

(58) Field of Classification Search
CPC ................................................. G06F 16/3344
See application file for complete search history.

(56) References Cited

U.S. PATENT DOCUMENTS

| | | | |
|---|---|---|---|
| 2007/0088743 A1 | 4/2007 | Kikuchi et al. | |
| 2007/0106658 A1* | 5/2007 | Ferrari | G06F 16/904 707/999.005 |
| 2012/0226682 A1* | 9/2012 | Li | G06F 16/951 707/723 |
| 2013/0290342 A1 | 10/2013 | Cooper et al. | |
| 2016/0239557 A1 | 8/2016 | Glover et al. | |

(Continued)

FOREIGN PATENT DOCUMENTS

| | | |
|---|---|---|
| CN | 102339294 A | 2/2012 |
| CN | 103631770 A | 3/2014 |

(Continued)

*Primary Examiner* — Van H Oberly
(74) *Attorney, Agent, or Firm* — Conley Rose, P.C.

(57) ABSTRACT

A data processing method applied to an artificial intelligence-based intelligent search field includes obtaining a to-be-queried text, determining, from a preset database, a to-be-queried object set corresponding to the to-be-queried text, where there is one or more to-be-queried object sets, and each to-be-queried object set includes one or more to-be-queried objects, determining relationship information of a to-be-queried object in each to-be-queried object set from preset relationship information between two objects, and determining, based on the relationship information of the to-be-queried object in each to-be-queried object set, a query field corresponding to the to-be-queried text.

20 Claims, 7 Drawing Sheets

(56) References Cited

U.S. PATENT DOCUMENTS

2016/0357851 A1* 12/2016 Perkins .................. G06F 16/31
2018/0268456 A1    9/2018 Kumar et al.
2018/0341866 A1   11/2018 Huang et al.

FOREIGN PATENT DOCUMENTS

| CN | 107451208 A | 12/2017 |
| CN | 108170859 A |  6/2018 |
| CN | 108205593 A |  6/2018 |
| CN | 108228657 A |  6/2018 |
| CN | 108228820 A |  6/2018 |
| CN | 108268500 A |  7/2018 |
| CN | 108427686 A |  8/2018 |
| CN | 108628941 A | 10/2018 |
| CN | 110008413 A |  7/2019 |
| CN | 110019911 A |  7/2019 |

* cited by examiner

DATA PROCESSING METHOD AND APPARATUS

CROSS-REFERENCE TO RELATED APPLICATIONS

This is a U.S. National Stage of International Patent Application No. PCT/CN2020/107291 filed on Aug. 6, 2020, which claims priority to Chinese Patent Application No. 201910776210.2 filed on Aug. 21, 2019, both of which are hereby incorporated by reference in their entireties.

This application claims priority to Chinese Patent Application No. 201910776210.2, filed with the China National Intellectual Property Administration on Aug. 21, 2019 and entitled "DATA PROCESSING METHOD AND APPARATUS", which is incorporated herein by reference in its entirety.

TECHNICAL FIELD

This application relates to the field of communications technologies, and in particular, to a data processing method and apparatus.

BACKGROUND

With continuous development of communications technologies, a terminal device supports more abundant applications. After receiving a query request, the terminal device may send the query request to all service providers supported by the terminal device. After receiving a query result returned by each service provider, the terminal device feeds back the query result to a user.

Currently, there is a huge amount of information in the Internet, and data in a field corresponding to each service provider has a problem of name repetition. For example, there are a plurality of versions of television dramas "Water Margin" in a film and television field, and there is a crosstalk "Water Margin" and a book review "Water Margin" in an audio field. Therefore, a query result corresponding to a same query request exists in the field corresponding to each service provider. However, a query result actually required by the user belongs to a field corresponding to one service provider or a small quantity of service providers. Therefore, query result redundancy is caused when query is performed in an existing query method.

SUMMARY

Embodiments of this application provide a data processing method and apparatus, to determine a query field corresponding to a to-be-queried text, so as to help reduce query result redundancy.

According to a first aspect, an embodiment of this application provides a data processing method. The method may be applied to an artificial intelligence-based intelligent search field. The method includes: obtaining a to-be-queried text; determining, from a preset database, a to-be-queried object set corresponding to the to-be-queried text, where there is one or more to-be-queried object sets, and each to-be-queried object set includes one or more to-be-queried objects; determining relationship information of a to-be-queried object in each to-be-queried object set from preset relationship information between two objects; and determining, based on the relationship information of the to-be-queried object in each to-be-queried object set, a query field corresponding to the to-be-queried text.

In this technical solution, a resource that is in a specific field in a plurality of fields supported by a serving device and that a user actually wants to access when the user enters the to-be-queried text may be determined based on the relationship information of the to-be-queried object in each to-be-queried object set. Further, a field that the user actually wants to access is used as the query field corresponding to the to-be-queried text. This helps reduce a quantity of queried fields. In other words, a query range can be reduced. Therefore, a query result that matches a user intention can be obtained through query. In addition, this helps improve query efficiency and reduce query result redundancy.

In an implementation, each to-be-queried object set may include one to-be-queried object, and the relationship information of the to-be-queried object in each to-be-queried object set may include one or more types of relationships; and a specific implementation of determining, based on the relationship information of the to-be-queried object in each to-be-queried object set, a query field corresponding to the to-be-queried text may be: if a type of a relationship of the to-be-queried object in each to-be-queried object set includes a type that is of a relationship and that belongs to a first preset field, determining that the first preset field belongs to the query field corresponding to the to-be-queried text.

Compared with a manner of determining, based on a relationship of the to-be-queried object, the query field corresponding to the to-be-queried text, in this technical solution in which the query field corresponding to the to-be-queried text is determined based on the type of a relationship of the to-be-queried object, efficiency of determining the query field corresponding to the to-be-queried text can be improved.

In an implementation, each to-be-queried object set may include a plurality of to-be-queried objects, and relationship information of each to-be-queried object in each to-be-queried object set may include a type of a relationship between the to-be-queried object and a to-be-queried object in the to-be-queried object set other than the to-be-queried object; and a specific implementation of determining, based on the relationship information of the to-be-queried object in each to-be-queried object set, a query field corresponding to the to-be-queried text may be: if all the to-be-queried objects in each to-be-queried object set are connected by using a relationship whose type belongs to a first preset field, determining that the first preset field belongs to the query field corresponding to the to-be-queried text.

In this technical solution, when each to-be-queried object set includes a plurality of to-be-queried objects, the resource that is in the specific field in the plurality of fields supported by the serving device and that the user actually wants to access when the user enters the to-be-queried text may be determined based on the type of a relationship of the to-be-queried object in each to-be-queried object set. Further, the field that the user actually wants to access is used as the query field corresponding to the to-be-queried text. In this way, the query result that matches the user intention can be obtained through query. In addition, this helps reduce a quantity of queried fields, improve query efficiency, and reduce query result redundancy. In addition, compared with the manner of determining, based on the relationship of the to-be-queried object, the query field corresponding to the to-be-queried text, in this technical solution in which the query field corresponding to the to-be-queried text is determined based on the type of a relationship of the to-be-queried object, efficiency of determining the query field corresponding to the to-be-queried text can be improved.

In an implementation, a specific implementation of determining, from a preset database, a to-be-queried object set corresponding to the to-be-queried text may be: determining a target text, where the target text is a text obtained after natural language understanding NLU processing is performed on the to-be-queried text; performing word segmentation processing on the target text, to obtain each word segment of the target text; and determining the to-be-queried object in each to-be-queried object set from the preset database based on each word segment of the target text.

In an implementation, each word segment of the target text corresponds to an object in the preset database; and a specific implementation of determining the to-be-queried object in each to-be-queried object set from the preset database based on each word segment of the target text may be: using, as to-be-queried objects in different to-be-queried object sets, different objects in the preset database that correspond to each word segment of the target text.

In an implementation, the word segment of the target text may include at least a first word segment and a second word segment, the first word segment corresponds to a first object in the preset database, and the second word segment corresponds to no object in the preset database; and a specific implementation of determining the to-be-queried object in each to-be-queried object set from the preset database based on each word segment of the target text may be: determining relationship information of the first object from the preset relationship information between two objects; determining, from the relationship information of the first object, first relationship information that has a matching relationship with the second word segment; determining a target object based on a second object if the first object is connected to the second object based on the first relationship information in the preset database; and using the target object as the to-be-queried object in each to-be-queried object set.

In this technical solution, when the word segment of the target text includes one first word segment and a plurality of second word segments, multi-level inference may be performed based on the first object that is in the preset database and that corresponds to the first word segment and the plurality of second word segments, to obtain a target entity. The target entity is used as the to-be-queried object in each to-be-queried object set. According to this manner, this helps determine an object that the user actually needs to query.

In an implementation, the method may further include: sending, to a serving device corresponding to the query field, text information corresponding to any to-be-queried object set; receiving a query result from the serving device corresponding to the query field; and outputting the query result.

In this technical solution, the text information corresponding to the to-be-queried object set is sent to only the serving device corresponding to the query field, so that the user can obtain a required query result, and extra overheads caused by sending the text information corresponding to the to-be-queried object set to serving devices corresponding to all fields supported by the serving device can be avoided. In addition, some query results that are not required by the user are prevented from being found, to help reduce query result redundancy.

According to a second aspect, an embodiment of this application provides a data processing apparatus. The apparatus may be a serving device, or may be an apparatus (for example, a chip) used for the serving device. The apparatus has a function of implementing the data processing method provided in the first aspect. The function may be implemented by using hardware, or may be implemented by hardware executing corresponding software. The hardware or the software includes one or more modules corresponding to the function.

According to a third aspect, an embodiment of this application provides a computer-readable storage medium, configured to store computer program instructions used by the data processing apparatus in the second aspect. The computer program instructions include a program used to execute the first aspect.

According to a fourth aspect, an embodiment of this application provides another data processing apparatus. The apparatus may be a serving device, or may be an apparatus (for example, a chip) used for the serving device. The apparatus includes a memory and a processor, the processor is connected to the memory through a bus, the memory stores program instructions, and the processor invokes the program instructions stored in the memory to implement the data processing method provided in the first aspect.

According to a fifth aspect, an embodiment of this application provides a computer program product. The program product includes a program, and when the program is executed by a data processing apparatus, the data processing apparatus is enabled to implement the method in the first aspect.

DESCRIPTION OF EMBODIMENTS

Figure 1A:
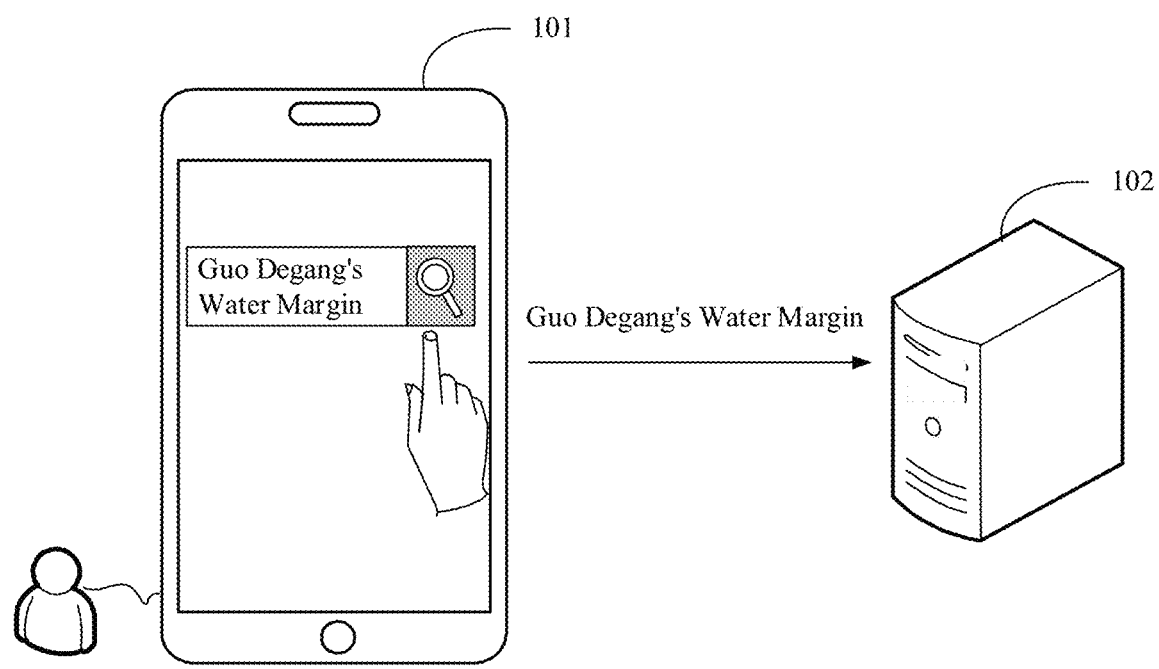
FIG. 1a is a schematic diagram of an architecture of a communications system according to an embodiment of this application.

For ease of understanding, terms involved in this application are first described.

1. Knowledge Graph (Knowledge Graph, KG)

The knowledge graph is a graph-based data structure, and includes a node and an edge. The knowledge graph is used to describe various entities and concepts that exist in the real world and a relationship thereof (for example, a relationship between concepts, a relationship between a concept and an entity, a relationship between entities). A piece of knowledge in the knowledge graph may be represented by using a 3-tuple (triple), and the 3-tuple may be represented as (entity 1, entity relationship, entity 2). The entity 1 and the entity 2 represent nodes in the knowledge graph, the entity relationship represents an edge in the knowledge graph, and the 3-tuple represents that the entity 1 and the entity 2 are associated by using the entity relationship in the knowledge graph.

The concept is a collection of entities having a same characteristic, for example, a country, a nationality, a book, or a computer. The concept is mainly a collection, a category, an object type, or a thing type, for example, people or geography. The entity represents a basic element belonging to a concept, for example, a specific entity indicated by a concept. The entity is a thing that is distinguishable and that exists independently, for example, a person, a city, a plant, or a commodity. The entity is a most basic element in the knowledge graph. There are different relations between different entities.

2. Natural Language Understanding (Natural Language Understanding, NLU)

Artificial intelligence (artificial intelligence, AI) is a new technical science that studies and develops theories, methods, techniques, and application systems for simulating, extending, and expanding human intelligence. A core of the AI is to use a machine learning technology to allow a machine to simulate some core aspects of human behavior. In other words, the AI allows the machine to behave as an autonomous system that is capable of performing sensing, performing learning, making a decision, and taking an action with little or no human intervention.

The NLU is an application field of the artificial intelligence. The NLU is a technology in which a natural language is used to communicate with a computer. Through the NLU, the computer can "understand" the natural language and perform a specific language function expected by a human In other words, the NLU is a bridge for communication between a human and a machine.

Language understanding may include but is not limited to the following content: (1) Be able to understand a correct order rule and concept of a sentence, and be able to understand a sentence including no rule; (2) Learn of an exact meaning, a form, a part of speech, and a word formation method of a word; (3) Learn of semantic categorization of the word, polysemy of the word, and ambiguity of the word; (4) Specified and indefinite characteristics and all characteristics; (5) Structural knowledge and a practical concept in a field of a problem; (6) Tone information and rhythmic expression of a language; (7) Written knowledge of a related language expression form; and (8) Background knowledge of a domain of discourse.

To better understand a data processing method disclosed in embodiments of this application, the following first describes a communications system to which the embodiments of this application is applicable.

FIG. 1a is a schematic diagram of an architecture of a communications system according to an embodiment of this application. As shown in FIG. 1a, the communications system includes a terminal device 101 and a serving device 102.

A user may enter, by using an input device of the terminal device 101, a to-be-queried text (for example, "Guo Degang's Water Margin") in a text box displayed on the terminal device 101, and then tap a query button, so that when detecting that the query button is tapped, the terminal device 101 sends the to-be-queried text to the serving device 102.

After receiving the to-be-queried text, the serving device 102 may determine, from a preset database, a to-be-queried object set corresponding to the to-be-queried text, where there may be one or more to-be-queried object sets, determine relationship information of a to-be-queried object in each to-be-queried object set from preset relationship information between two objects, and then determine, based on the relationship information of the to-be-queried object in each to-be-queried object set, a query field corresponding to the to-be-queried text. Each to-be-queried object set may include one or more to-be-queried objects.

The to-be-queried object may be an entity in the preset database. For example, when the to-be-queried text is "Guo Degang's Water Margin", if the to-be-queried text corresponds to one to-be-queried object set, to-be-queried objects in the to-be-queried object set may include a character "Guo Degang" and a crosstalk "Water Margin". The character "Guo Degang" and the crosstalk "Water Margin" each are an entity in the preset database.

The relationship information of the to-be-queried object is relationship information of an entity corresponding to the to-be-queried object in the preset database. To be specific, the relationship information of the to-be-queried object may include relationship information between the entity corresponding to the to-be-queried object in the preset database and an entity other than the entity corresponding to the to-be-queried object in the preset database. For example, when the to-be-queried object is the character "Guo Degang", the relationship information of the to-be-queried object may include but is not limited to relationship information between the character "Guo Degang" and the crosstalk "Water Margin" and relationship information between the character "Guo Degang" and Deyunshe founded by Guo Degang.

In an implementation, the communications system shown in FIG. 1a may further include a data server (not shown in FIG. 1a). After determining the query field, the serving device 102 may send, to a data server corresponding to the query field, text information corresponding to any to-be-queried object set, receive a query result from the data server, and output the query result, so that the user make selection based on a requirement of the user.

In an implementation, the steps performed by the serving device 102 in FIG. 1a may be performed by the terminal device 101 instead. To be specific, the terminal device 101 may determine, from the preset database, the to-be-queried object set corresponding to the to-be-queried text, determine the relationship information of the to-be-queried object in each to-be-queried object set from the preset relationship information between two objects, and determine, based on the relationship information of the to-be-queried object in each to-be-queried object set, the query field corresponding to the to-be-queried text. Similarly, in an implementation, the steps performed by the terminal device 101 in FIG. 1a may be performed by the serving device 102 instead. To be specific, the to-be-queried text received by the serving device 102 in FIG. 1a may be obtained by the serving device 102 based on an input operation of the user.

The terminal device 101 in this embodiment of this application is an entity, for example, a mobile phone, that is on a user side and that is configured to receive or transmit a signal. The terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a smart TV, a wearable device, a tablet computer (Pad), a computer having a wireless transceiver function, a virtual reality (virtual reality, VR) terminal device, or an augmented reality (augmented reality, AR) terminal device, a wireless terminal in industrial control, a wireless terminal in self-driving (self-driving), a wireless terminal in remote surgery (remote medical surgery), a wireless terminal in smart grid (smart grid), a wireless terminal in transportation safety (transportation safety), a wireless terminal in smart city (smart city), a wireless terminal in smart home (smart home), or the like. A specific technology and a specific device form that are used for the terminal device are not limited in the embodiments of this application.

The serving device 102 in this embodiment of this application may include a processor, a memory, and a network interface, and the serving device 102 may be a terminal device or a server.

It should be noted that the technical solutions in this embodiment of this application may be applied to an artificial intelligence based query system such as an intelligent search system and an intelligent question answering system. When the technical solutions are applied to the intelligent search system, the data server may be a resource server such as a search engine server or a multimedia server. When the technical solutions are applied to the intelligent question answering system, the data server may be a search engine server or another resource server.

It can be understood that the communications system described in this embodiment of this application is used to describe the technical solution in this embodiment of this application more clearly, but does not limit the technical solution provided in this embodiment of this application. A person of ordinary skill in the art may learn that with evolution of a system architecture and emergence of a new service scenario, the technical solutions provided in this embodiment of this application is also applicable to a similar technical problem.

To better understand this embodiment of this application, the following describes a structure of the serving device in this embodiment of this application.

Figure 1B:
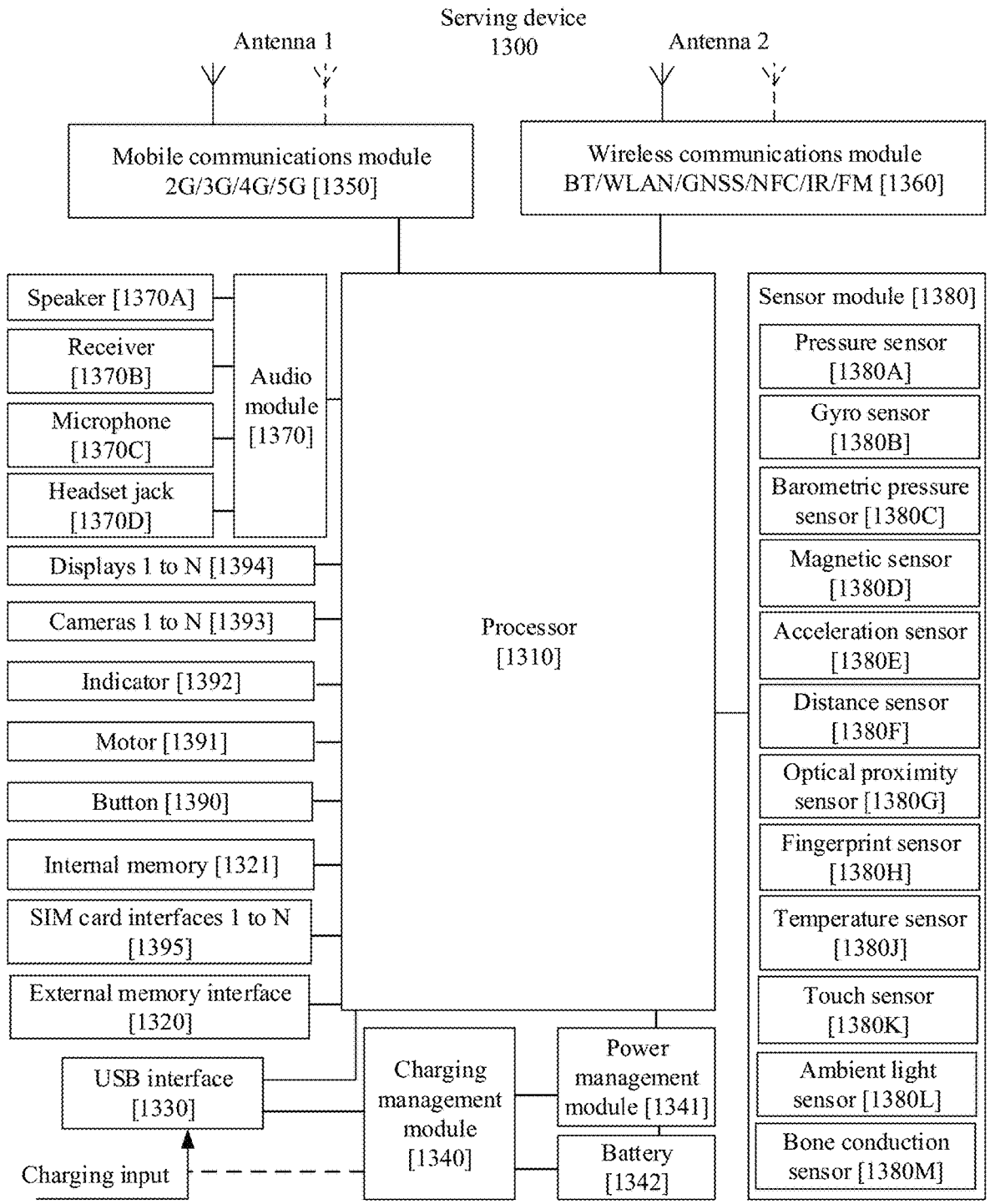
FIG. 1b is a schematic diagram of a structure of a serving device according to an embodiment of this application.

FIG. 1*b* is a schematic diagram of a structure of a serving device 1300. The serving device 1300 may include a processor 1310, an external memory interface 1320, an internal memory 1321, a universal serial bus (universal serial bus, USB) interface 1330, a charging management module 1340, a power management module 1341, a battery 1342, an antenna 1, an antenna 2, a mobile communications module 1350, a wireless communications module 1360, an audio module 1370, a speaker 1370A, a receiver 1370B, a microphone 1370C, a headset jack 1370D, a sensor module 1380, a button 1390, a motor 1391, an indicator 1392, a camera 1393, a display 1394, a subscriber identification module (subscriber identification module, SIM) card interface 1395, and the like. The sensor module 1380 may include a pressure sensor 1380A, a gyro sensor 1380B, a barometric pressure sensor 1380C, a magnetic sensor 1380D, an acceleration sensor 1380E, a distance sensor 1380F, an optical proximity sensor 1380G, a fingerprint sensor 1380H, a temperature sensor 1380J, a touch sensor 1380K, an ambient light sensor 1380L, a bone conduction sensor 1380M, and the like.

It may be understood that the structure illustrated in this embodiment of the present invention does not constitute a specific limitation on the serving device 1300. In some other embodiments of this application, the serving device 1300 may include more or fewer components than those shown in the figure, or combine some components, or split some components, or have different component arrangements. The components shown in the figure may be implemented by using hardware, software, or a combination of software and hardware.

The processor 1310 may include one or more processing units. For example, the processor 1310 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on instruction operation code and a time sequence signal, to complete control over instruction fetching and instruction execution.

A memory may be further disposed in the processor 1310, and is configured to store instructions and data. In some embodiments, the memory in the processor 1310 is a cache. The memory may store instructions or data just used or cyclically used by the processor 1310. If the processor 1310 needs to use the instructions or the data again, the processor 1310 may directly invoke the instructions or the data from the memory. This avoids repeated access and reduces a waiting time of the processor 1310, thereby improving system efficiency.

In some embodiments, the processor 1310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 1310 may include a plurality of groups of I2C buses. The processor 1310 may be separately coupled to the touch sensor 1380K, a charger, a flash, the camera 1393, and the like through different I2C bus interfaces. For example, the processor 1310 may be coupled to the touch sensor 1380K through the I2C interface, so that the processor 1310 communicates with the touch sensor 1380K through the I2C bus interface, to implement a touch function of the serving device 1300.

The I2S interface may be configured to perform audio communication. In some embodiments, the processor 1310 may include a plurality of groups of I2S buses. The processor 1310 may be coupled to the audio module 1370 through the I2S bus, to implement communication between the processor 1310 and the audio module 1370. In some embodiments, the audio module 1370 may transmit an audio signal to the wireless communications module 1360 through the I2S interface, to implement a function of answering a call by using a Bluetooth headset.

The PCM interface may also be configured to: perform audio communication, and sample, quantize, and code an analog signal. In some embodiments, the audio module 1370 may be coupled to the wireless communications module 1360 through a PCM bus interface. In some embodiments, the audio module 1370 may alternatively transmit an audio signal to the wireless communications module 1360 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 1310 to the wireless communications module 1360. For example, the processor 1310 communicates with a Bluetooth module in the wireless communications module 1360 through the UART interface, to implement a Bluetooth function. In some embodiments, the audio module 1370 may transmit an audio signal to the wireless communications module 1360 through the UART interface, to implement a function of playing music by using a Bluetooth headset.

The MIPI interface may be configured to connect the processor 1310 to peripheral devices such as the display 1394 and the camera 1393. The MIPI interface includes a camera serial interface (camera serial interface, CSI), a display serial interface (display serial interface, DSI), and the like. In some embodiments, the processor 1310 communicates with the camera 1393 through the CSI interface, to implement a photographing function of the serving device 1300. The processor 1310 communicates with the display 1394 through the DSI interface, to implement a display function of the serving device 1300.

The GPIO interface may be configured by using software. The GPIO interface may be configured as a control signal or a data signal. In some embodiments, the GPIO interface may be configured to connect the processor 1310 to the camera 1393, the display 1394, the wireless communications module 1360, the audio module 1370, the sensor module 1380, and the like. The GPIO interface may alternatively be configured as an I2C interface, an I2S interface, a UART interface, an MIPI interface, or the like.

The USB interface 1330 is an interface that conforms to a USB standard specification, and may be specifically a mini USB interface, a micro USB interface, a USB Type-C interface, or the like. The USB interface 1330 may be configured to be connected to a charger to charge the serving device 1300, may be configured to transmit data between the serving device 1300 and a peripheral device, or may be configured to be connected to a headset for playing audio through the headset. The interface may be further configured to be connected to another serving device, for example, an AR device.

It may be understood that an interface connection relationship between modules illustrated in this embodiment of the present invention is merely an example for description, and does not constitute a limitation on a structure of the serving device 1300. In some other embodiments of this application, different interface connection manners in the foregoing embodiments or a combination of a plurality of interface connection manners may alternatively be used for the serving device 1300.

The charging management module 1340 is configured to receive charging input from a charger. The charger may be a wireless charger or a wired charger. In some embodiments of wired charging, the charging management module 1340 may receive charging input from the wired charger through the USB interface 1330. In some wireless charging embodiments, the charging management module 1340 may receive a wireless charging input by using a wireless charging coil of the serving device 1300. While charging the battery 1342, the charging management module 1340 may further supply power to the serving device by using the power management module 1341.

The power management module 1341 is configured to connect to the battery 1342, the charging management module 1340, and the processor 1310. The power management module 1341 receives input from the battery 1342 and/or the charging management module 1340, and supplies power to the processor 1310, the internal memory 1321, the display 1394, the camera 1393, the wireless communications module 1360, and the like. The power management module 1341 may be further configured to monitor parameters such as a battery capacity, a battery cycle count, and a battery health status (electric leakage or impedance). In some other embodiments, the power management module 1341 may alternatively be disposed in the processor 1310. In some other embodiments, the power management module 1341 and the charging management module 1340 may alternatively be disposed in a same device.

A wireless communications function of the serving device 1300 may be implemented by using the antenna 1, the antenna 2, the mobile communications module 1350, the wireless communications module 1360, the modem processor, the baseband processor, or the like.

The antenna 1 and the antenna 2 are configured to transmit and receive electromagnetic wave signals. Each antenna in the serving device 1300 may be configured to cover a single or a plurality of communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 1350 may provide a solution to wireless communication including 2G/3G/4G/5G applied to the serving device 1300. The mobile communications module 1350 may include at least one filter, a switch, a power amplifier, a low noise amplifier (low noise amplifier, LNA), and the like. The mobile communications module 1350 may receive an electromagnetic wave through the antenna 1, perform processing such as filtering or amplification on the received electromagnetic wave, and transmit a processed electromagnetic wave to the modem processor for demodulation. The mobile communications module 1350 may further amplify a signal modulated by the modem processor, and convert the signal into an electromagnetic wave for radiation by using the antenna 1. In some embodiments, at least some function modules of the mobile communications module 1350 may be disposed in the processor 1310. In some embodiments, at least some function modules of the mobile communications module 1350 and at least some modules of the processor 1310 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then a processed low-frequency baseband signal is transferred to the application processor. The application processor outputs a sound signal through an audio device (which is not limited to the speaker 1370A, the receiver 1370B, or the like), or displays an image or a video through the display 1394. In some embodiments, the modem processor may be an independent device. In some other embodiments, the modem processor may be independent of the processor 1310, and is disposed in a same device as the mobile communications module 1350 or another function module.

The wireless communications module 1360 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the serving device 1300. The wireless communications module 1360 may be one or more components integrated into at least one communications processing module. The wireless communications module 1360 receives an electromagnetic wave through the antenna 2, performs frequency modulation and filtering processing on an electromagnetic wave signal, and sends a processed signal to the processor 1310. The wireless communications module 1360 may further receive a to-be-sent signal from the processor 1310, perform frequency modulation and amplification on the signal, and convert the signal into an electromagnetic wave for radiation through the antenna 2.

In some embodiments, the antenna 1 of the serving device 1300 is coupled to the mobile communications module 1350, and the antenna 2 is coupled to the wireless communications module 1360, so that the serving device 1300 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LIE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The serving device 1300 implements a display function by using the GPU, the display 1394, the application processor, and the like. The GPU is a microprocessor for image processing, and connects the display 1394 to the application processor. The GPU is configured to: perform mathematical and geometric calculation, and render an image. The processor 1310 may include one or more GPUs that execute program instructions to generate or change display information.

The display 1394 is configured to display an image, a video, and the like. The display 1394 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diodes, QLED), or the like. In some embodiments, the serving device 1300 may include one or N displays 1394, where N is a positive integer greater than 1.

The serving device 1300 may implement a photographing function by using the ISP, the camera 1393, the video codec, the GPU, the display 1394, the application processor, or the like.

The ISP is configured to process data fed back by the camera 1393. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 1393.

The camera 1393 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the serving device 1300 may include one or N cameras 1393, where N is a positive integer greater than 1.

The digital signal processor is configured to process a digital signal, and may process another digital signal in addition to the digital image signal. For example, when the serving device 1300 selects a frequency, the digital signal processor is configured to perform Fourier transform on the frequency energy.

The video codec is configured to compress or decompress a digital video. The serving device 1300 may support one or more video codecs. In this case, the serving device 1300 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the serving device 1300 may be implemented by using the NPU, for example, image recognition, face recognition, speech recognition, and text understanding The external memory interface 1320 may be configured to be connected to an external memory card, for example, a Micro SD card, to extend a storage capability of the serving device 1300. The external memory card communicates with the processor 1310 through the external memory interface 1320, to implement a data storage function. For example, files such as music and videos are stored in the external memory card.

The internal memory 1321 may be configured to store computer executable program code. The executable program code includes instructions. The internal memory 1321 may include a program storage area and a data storage area. The program storage area may store an operating system, an application required by at least one function (for example, a sound playing function or an image playing function), and the like. The data storage area may store data (for example, audio data or a phone book) created in a process of using the serving device 1300. In addition, the internal memory 1321 may include a high-speed random access memory, and may further include a non-volatile memory, for example, at least one magnetic disk storage device, a flash memory device, or a universal flash storage (universal flash storage, UFS). The processor 1310 executes various function applications and data processing of the serving device 1300 by running the instruction stored in the internal memory 1321 and/or instructions stored in a memory disposed in the processor.

The serving device 1300 may implement an audio function, for example, playing music and recording, by using the audio module 1370, the speaker 1370A, the receiver 1370B, the microphone 1370C, the headset jack 1370D, the application processor, or the like.

The audio module 1370 is configured to convert digital audio information into an analog audio signal for output, and is also configured to convert analog audio input into a digital audio signal. The audio module 1370 may be further configured to: code and decode audio signals. In some embodiments, the audio module 1370 may be disposed in the processor 1310, or some function modules in the audio module 1370 are disposed in the processor 1310.

The speaker 1370A, also referred to as a "horn", is configured to convert an audio electrical signal into a sound signal. The serving device 1300 may listen to music or listen to a hands-free call through the speaker 1370A.

The receiver 1370B, also referred to as an "earpiece", is configured to convert an audio electrical signal into a sound signal. When a call is answered or audio information is listened to by using the serving device 1300, the receiver 1370B may be put close to a human ear to listen to a voice.

The microphone 1370C, also referred to as a "mike" or a "mic", is configured to convert a sound signal into an electrical signal. When making a call or sending voice information, a user may make a sound by moving a human mouth close to the microphone 1370C to input a sound signal to the microphone 1370C. The serving device 1300 may be provided with at least one microphone 1370C. In some other embodiments, the serving device 1300 may be provided with two microphones 1370C, to implement a noise reduction function in addition to collecting a sound signal. In some other embodiments, the serving device 1300 may be further provided with three, four, or more microphones 1370C, to collect a sound signal, reduce noise, identify a sound source, implement a directional recording function, and the like.

The headset jack 1370D is configured to be connected to a wired headset. The headset jack 1370D may be a USB interface 1330, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 1380A is configured to sense a pressure signal, and may convert the pressure signal into an electrical signal. In some embodiments, the pressure sensor 1380A may be disposed on the display 1394. There are many types of pressure sensors 1380A such as a resistive pressure sensor, an inductive pressure sensor, and a capacitive pressure sensor. The capacitive pressure sensor may include at least two parallel plates made of conductive materials. When a force is applied to the pressure sensor 1380A, capacitance between electrodes changes. The serving device 1300 determines strength of the pressure based on the change in the capacitance. When a touch operation acts on the display 1394, the serving device 1300 detects intensity of the touch operation based on the pressure sensor 1380A. The serving device 1300 may also calculate a touch location based on a detection signal of the pressure sensor 1380A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating an SMS message is executed.

The gyro sensor 1380B may be configured to determine a moving posture of the electronic device 1300. In some embodiments, an angular velocity of the electronic device 1300 around three axes (to be specific, axes x, y, and z) may be determined by using the gyro sensor 1380B. The gyro sensor 1380B may be configured to perform image stabilization during photographing. For example, when the shutter is pressed, the gyro sensor 1380B detects an angle at which the serving device 1300 jitters, calculates, based on the angle, a distance for which a lens module needs to compensate, and allows the lens to cancel the jitter of the serving device 1300 through reverse motion, to implement image stabilization. The gyro sensor 1380B may be further used in navigation and motion sensing game scenarios.

The barometric pressure sensor 1380C is configured to measure barometric pressure. In some embodiments, the serving device 1300 calculates an altitude by using a pressure value obtained through measurement by the pressure sensor 1380C, and assists in positioning and navigation.

The magnetic sensor 1380D includes a Hall sensor. The serving device 1300 may detect opening and closing of a flip cover by using the magnetic sensor 1380D. In some embodiments, when the serving device 1300 is a flip phone, the serving device 1300 may detect opening and closing of a flip cover based on the magnetic sensor 1380D. Further, a feature such as automatic unlocking upon opening of the flip cover is set based on a detected opening or closing state of the flip cover.

The acceleration sensor 1380E may detect magnitude of accelerations in various directions (usually on three axes) of the serving device 1300, and may detect magnitude and a direction of the gravity when the serving device 1300 is still. The acceleration sensor 1380E may be further configured to identify a posture of the electronic device, and is applied to an application such as switching between a landscape mode and a portrait mode or a pedometer.

The distance sensor 1380F is configured to measure a distance. The serving device 1300 may measure the distance in an infrared manner or a laser manner. In some embodiments, in a photographing scenario, the serving device 1300 may measure a distance by using the distance sensor 1380F, to implement quick focusing.

For example, the optical proximity sensor 1380G may include a light-emitting diode (LED) and an optical detector, for example, a photodiode. The light-emitting diode may be an infrared light-emitting diode. The serving device 1300 emits infrared light by using the light emitting diode. The serving device 1300 detects infrared reflected light from a nearby object by using the photodiode. When plenty of reflected light is detected, it may be determined that there is an object near the serving device 1300. When insufficient reflected light is detected, the serving device 1300 may determine that there is an object near the serving device 1300. The serving device 1300 may detect, by using the optical proximity sensor 1380G, that the user holds the serving device 1300 close to an ear to make a call, to automatically perform screen-off for power saving. The optical proximity sensor 1380G may also be used in a flip cover mode or a pocket mode to automatically unlock or lock the screen.

The ambient light sensor 1380L is configured to sense ambient light brightness. The serving device 1300 may adaptively adjust brightness of the display 1394 based on the sensed ambient light brightness. The ambient light sensor 1380L may also be configured to automatically adjust white balance during photographing. The ambient light sensor 1380L may also cooperate with the optical proximity sensor 1380G, to detect whether the serving device 1300 is in a pocket, to avoid an accidental touch.

The fingerprint sensor 1380H is configured to collect a fingerprint. The serving device 1300 may use a feature of the collected fingerprint to implement fingerprint-based unlocking, application lock access, fingerprint-based photographing, fingerprint-based call answering, and the like.

The temperature sensor 1380J is configured to detect a temperature. In some embodiments, the serving device 1300 executes a temperature processing policy based on the temperature detected by the temperature sensor 1380J. For example, when a temperature reported by the temperature sensor 1380J exceeds a threshold, the serving device 1300 lowers performance of a processor located near the temperature sensor 1380J, to reduce power consumption for thermal protection. In some other embodiments, when the temperature is lower than another threshold, the serving device 1300 heats the battery 1342, to prevent the serving device 1300 from being shut down abnormally due to a low temperature. In some other embodiments, when the temperature is lower than still another threshold, the serving device 1300 boosts an output voltage of the battery 1342, to avoid abnormal shutdown caused by a low temperature.

The touch sensor 1380K is also referred to as a "touch component". The touch sensor 1380K may be disposed on the display 1394, and the touch sensor 1380K and the display 1394 form a touchscreen, which is also referred to as a "touch screen". The touch sensor 1380K is configured to detect a touch operation performed on or near the touch sensor 1380K. The touch sensor may transfer the detected touch operation to the application processor, to determine a type of a touch event. Visual output related to the touch operation may be provided by using the display 1394. In some other embodiments, the touch sensor 1380K may alternatively be disposed on a surface of the serving device 1300, and is located on a location different from that of the display 1394.

The bone conduction sensor 1380M may obtain a vibration signal. In some embodiments, the bone conduction sensor 1380M may obtain a vibration signal of a vibration bone of a human vocal part. The bone conduction sensor 1380M may also be in contact with a human pulse, and receive a blood pressure beating signal. In some embodiments, the bone conduction sensor 1380M may alternatively be disposed in a headset to form a bone conduction headset. The audio module 1370 may obtain a voice signal through parsing based on the vibration signal that is of the vibration bone of the vocal part and that is obtained by the bone conduction sensor 1380M, to implement a voice function. The application processor may parse heart rate information based on the blood pressure beating signal obtained by the bone conduction sensor 1380M, to implement a heart rate detection function.

The button 1390 includes a power button, a volume button, and the like. The button 1390 may be a mechanical button, or may be a touch button. The serving device 1300 may receive a key input, and generate a key signal input related to a user setting and function control of the serving device 1300.

The motor 1391 may generate a vibration prompt. The motor 1391 may be used for an incoming call vibration prompt, or may be used for a touch vibration feedback. For example, touch operations performed on different applications (for example, photographing and audio playing) may correspond to different vibration feedback effects. The motor 1391 may also correspond to different vibration feedback effects for touch operations performed on different areas of the display 1394. Different application scenarios (for example, a time reminder scenario, an information receiving scenario, an alarm clock scenario, and a game scenario) may also correspond to different vibration feedback effects. A touch vibration feedback effect may be further customized.

The indicator 1392 may be an indicator light, and may be configured to indicate a charging status and a power change, or may be configured to indicate a message, a missed call, a notification, and the like.

The SIM card interface 1395 is configured to connect to a SIM card. The SIM card may be inserted into the SIM card interface 1395 or detached from the SIM card interface 1395, to implement contact with or separation from the serving device 1300. The serving device 1300 may support one or N SIM card interfaces, and N is a positive integer greater than 1. The SIM card interface 1395 may support a nano-SIM card, a micro-SIM card, a SIM card, and the like. A plurality of cards may be inserted into a same SIM card interface 1395 at the same time. The plurality of cards may be of a same type or of different types. The SIM card interface 1395 may also be compatible with different types of SIM cards. The SIM card interface 1395 may also be compatible with the external memory card. The serving device 1300 interacts with a network by using the SIM card, to implement functions such as conversation and data communication. In some embodiments, an eSIM, namely, an embedded SIM card, is used for the serving device 1300. The eSIM card may be embedded into the serving device 1300, and cannot be separated from the serving device 1300.

A software system of the serving device 1300 is described in detail below:

A hierarchical architecture, an event driven architecture, a microkernel architecture, a microservice architecture, or a cloud architecture may be used for the software system of the serving device 1300. In this embodiment of the present invention, an Android system of the hierarchical architecture is used as an example to describe the software structure of the serving device 1300.

Figure 1C:
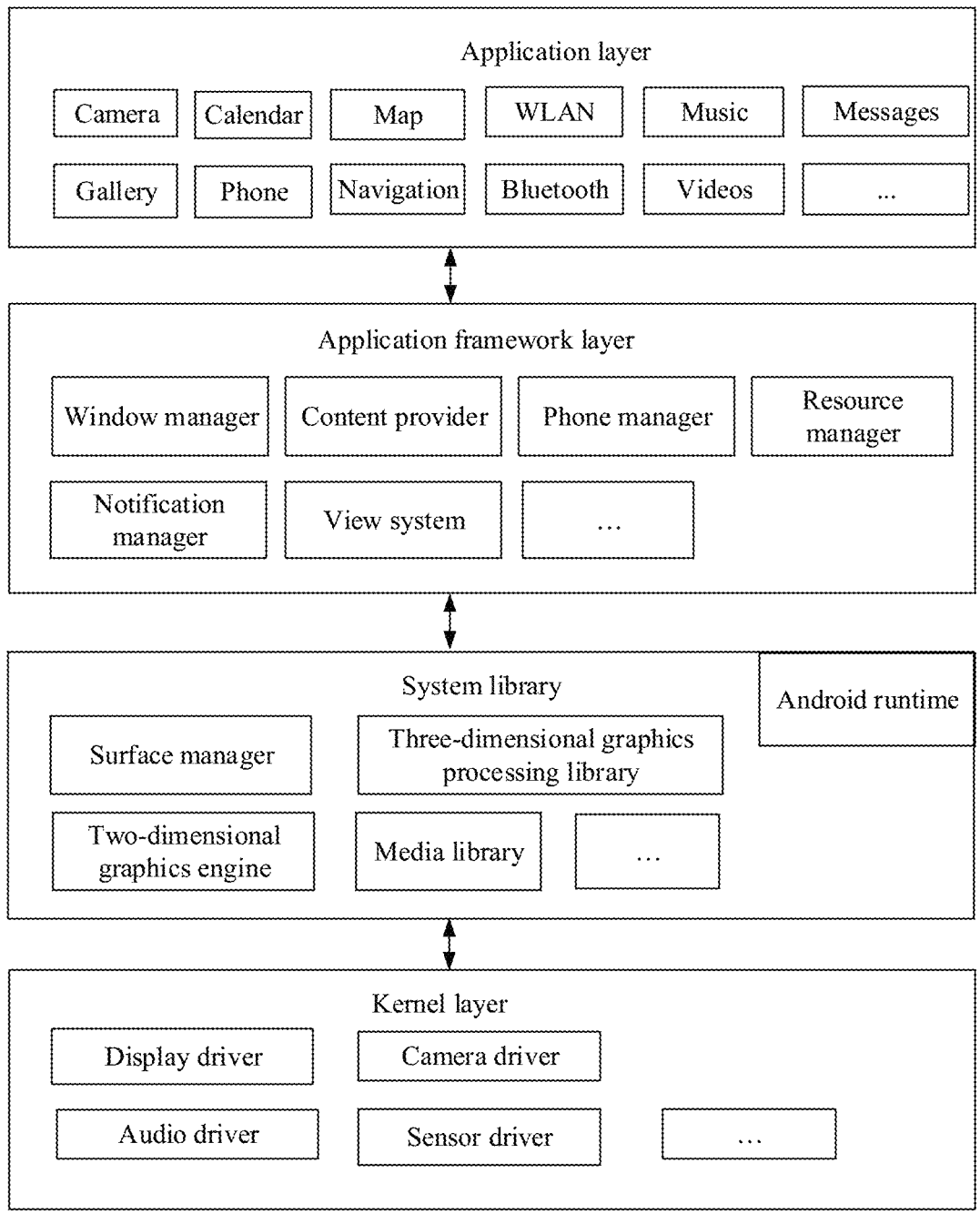
FIG. 1c is a schematic diagram of a software system of a serving device according to an embodiment of this application.

FIG. 1c is a block diagram of a software structure of a serving device 1300 according to an embodiment of the present invention. In the layered architecture, software is divided into several layers, and each layer has a clear role and task. The layers communicate with each other through a software interface. In some embodiments, the Android system is divided into four layers, that is, an application layer, an application framework layer, an Android runtime (Android runtime) and system library, and a kernel layer from top to bottom.

The application layer may include a series of application packages. As shown in FIG. 1c, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions. As shown in FIG. 1c, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessible by an application. The data may include a video, an image, audio, calls that are made and received, a browsing history and bookmarks, a phone book, and the like.

The view system includes visual controls, such as a control for displaying a text and a control for displaying a picture. The view system may be configured to construct an application. A display interface may include one or more views. For example, a display interface including an SMS message notification icon may include a text display view and a picture display view.

The phone manager is configured to provide a communication function of the serving device 1300, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification-type message, where the displayed notification information may automatically disappear after a short pause and require no user interaction. For example, the notification manager is configured to notify download completion, provide a message notification, and the like. The notification manager may alternatively be a notification that appears in the status bar at the top of the system in a form of a graph or a scroll bar text, for example, a notification of an application running on the background or a notification that appears on the screen in a form of a dialog window. For example, text information is prompted in the status bar, an alert sound is made, the serving device vibrates, and an indicator blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of frequently used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the serving device 1300 with reference to a photographing scenario.

When the touch sensor 1380K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and recognizes a control corresponding to the input event. For example, the touch operation is a single-tap touch operation, and a control corresponding to the single-tap operation is a control of a camera application icon. A camera application invokes an interface at the application framework layer to enable the camera application, then enables a camera driver by invoking the kernel layer, and captures a static image or a video by using the camera 1393.

The following describes in detail the data processing method and apparatus provided in this application with reference to the accompanying drawings.

Figure 2:
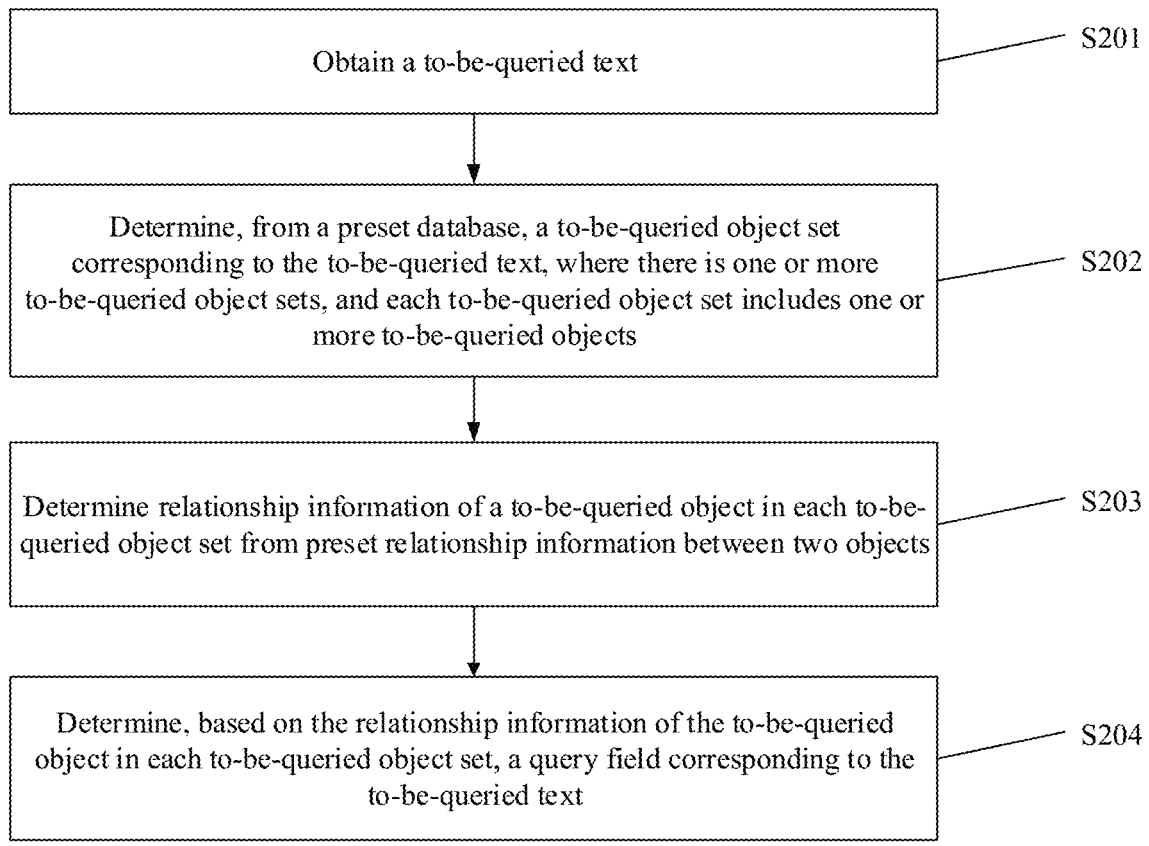
FIG. 2 is a schematic flowchart of a data processing method according to an embodiment of this application.

FIG. 2 is a schematic flowchart of a data processing method according to an embodiment of this application. Steps S201 to S204 are performed by a serving device or a chip in the serving device. That the serving device performs the data processing method is used as an example for description below. As shown in FIG. 2, the method may include but is not limited to the following steps.

Step S201: The serving device obtains a to-be-queried text.

The to-be-queried text may be one word, or may be a sentence including a plurality of words. In an implementation, when the method shown in FIG. 2 is applied to an artificial intelligence based intelligent search system, the to-be-queried text may be a query statement entered by a user during a query search, and the query statement may be entered in a text form, or may be entered in a voice form. When the query statement is entered in the voice form, a query statement in a voice format needs to be converted to a text format.

In an implementation, when the method shown in FIG. 2 is applied to an artificial intelligence based intelligent question answering system, the to-be-queried text may be a question entered by the user during a query, and question may be entered in a text form, or may be entered in a voice form. When the question is entered in the voice form, a question in a voice format needs to be converted to a text format.

In an implementation, the to-be-queried text may be entered by the user in a terminal device and sent by the terminal device to the serving device, or the to-be-queried text may be entered by the user in the serving device. This is not limited in this embodiment of this application. The serving device may be the serving device 102 in FIG. 1a.

In this embodiment of this application, when obtaining the to-be-queried text, the serving device indicates that a query field corresponding to the to-be-queried text needs to be determined. Specifically, before determining the query field corresponding to the to-be-queried text, the serving device needs to determine a to-be-queried object set corresponding to the to-be-queried text, and determine, based on relationship information of a to-be-queried object in the to-be-queried object set, the query field corresponding to the to-be-queried text.

Step S202: The serving device determine, from a preset database, the to-be-queried object set corresponding to the to-be-queried text, where there is one or more to-be-queried object sets, and each to-be-queried object set includes one or more to-be-queried objects.

Specifically, after obtaining the to-be-queried text, the serving device may determine, from the preset database, the to-be-queried object set corresponding to the to-be-queried text. There may be one or more to-be-queried object sets, each to-be-queried object set may include one or more to-be-queried objects, and there is a same quantity of to-be-queried objects in each to-be-queried object set.

The to-be-queried object may be an entity in the preset database. For example, when the to-be-queried text is "Guo Degang's Water Margin", if the to-be-queried text corresponds to one to-be-queried object set, to-be-queried objects in the to-be-queried object set may include a character "Guo Degang" and a crosstalk "Water Margin". The character "Guo Degang" and the crosstalk "Water Margin" each are an entity in the preset database.

Different to-be-queried object sets may include completely different to-be-queried objects, or may include partially different to-be-queried objects. For example, when the to-be-queried text is "Guo Degang's Water Margin", if the to-be-queried text corresponds to two to-be-queried object sets, to-be-queried objects in the $1^{st}$ to-be-queried object set may include a character "Guo Degang" and a crosstalk "Water Margin", and to-be-queried objects in the $2^{nd}$ to-be-queried object set may include the character "Guo Degang" and a television drama "Water Margin". The crosstalk "Water Margin" and the television drama "Water Margin" are two different entities in the preset database that correspond to a word "Water Margin".

A same word may correspond to one or more entities in the preset database, and a quantity of to-be-queried object sets may be determined based on a quantity of entities in the preset database that correspond to a word corresponding to the to-be-queried text. Specifically, the quantity of to-be-queried object sets may be a product of quantities of entities in the preset database that correspond to all words corresponding to the to-be-queried text. For example, when the to-be-queried text is "Guo Degang's Water Margin" and two words corresponding to the to-be-queried text are respectively "Guo Degang" and "Water Margin", if the word "Guo Degang" corresponds to two entities in the preset database (for example, a character "Guo Degang" and a book "Guo Degang") and the word "Water Margin" also corresponds to two entities in the preset database (for example, a crosstalk "Water Margin" and a television drama "Water Margin"), there may be 2×2 to-be-queried object sets. To-be-queried objects in the $1^{st}$ to-be-queried object set include the character "Guo Degang" and the crosstalk "Water Margin"; to-be-queried objects in the $2^{nd}$ to-be-queried object set include the character "Guo Degang" and the television drama "Water Margin"; to-be-queried objects in the $3^{rd}$ to-be-queried object set include the book "Guo Degang" and the crosstalk "Water Margin"; and to-be-queried objects in the 4th to-be-queried object set include the book "Guo Degang" and the television drama "Water Margin".

In an implementation, the quantity of to-be-queried object sets may be less than the product of the quantities of entities in the preset database that correspond to all words corresponding to the to-be-queried text. For example, when the to-be-queried text is "Guo Degang's Water Margin" and two words corresponding to the to-be-queried text are respectively "Guo Degang" and "Water Margin", if the word "Guo Degang" corresponds to two entities in the preset database (for example, a character "Guo Degang" and a book "Guo Degang") and the word "Water Margin" also corresponds to two entities in the preset database (for example, a crosstalk "Water Margin" and a television drama "Water Margin"), the serving device may separately perform entity disambiguation processing on the words "Guo Degang" and "Water Margin", and further determine that an entity corresponding to the word "Guo Degang" is the character "Guo Degang", and that entities corresponding to the word "Water Margin" is the crosstalk "Water Margin" and the television drama "Water Margin". After performing entity disambiguation processing, the serving device may determine that there are 1×2 to-be-queried object sets. To-be-queried objects in the $1^{st}$ to-be-queried object set includes the character "Guo Degang" and the crosstalk "Water Margin", and to-be-queried objects in the $2^{nd}$ to-be-queried object set includes the character "Guo Degang" and the television drama "Water Margin". It should be noted that to-be-queried objects in all to-be-queried object sets correspond to a same word. For example, words corresponding to the to-be-queried objects in the $1^{st}$ to-be-queried object set and words corresponding to the to-be-queried objects in the $2^{nd}$ to-be-queried object set in the foregoing example each are "Guo Degang" and "Water Margin".

Ambiguity of an entity means that a same word may correspond to a plurality of different concepts. For example, the word "Guo Degang" may be a character, or may be the book "Guo Degang" with the same name as the character "Guo Degang". A concept that really corresponds to a word may be determined through entity disambiguation. For example, when the to-be-queried text is "Guo Degang's Water Margin", it may be determined that a real entity corresponding to the word "Guo Degang" in the to-be-queried text is a character, in other words, the corresponding real entity is the character "Guo Degang".

In an actual application, if the to-be-queried text entered by the user is directly searched for, a query result that is actually required by the user may not be found, or query result redundancy may be caused. For example, when the to-be-queried text entered by the user is "a work of Deng Chao's wife", the user actually wants to query "Sun Li's work" (Deng Chao's wife is Sun Li). However, in an actual search process, a search result may be a resource related to Deng Chao's work. In this case, a query result that is actually required by the user cannot be found. Alternatively, a search result is a resource related to Deng Chao's work and a resource related to Sun Li's work. In this case, the resource related to Deng Chao's work in a query result is information that is not required by the user. Consequently, query result redundancy is caused.

In this embodiment of this application, text information corresponding to the to-be-queried object set may be information that the user actually wants to query. For example, when the to-be-queried text is "a work of Deng Chao's wife", the to-be-queried object set may include one to-be-queried object, and the to-be-queried object is a character "Sun Li". In this case, text information corresponding to a to-be-queried object set in which the character "Sun Li" is located is "Sun Li's work", and the text information is information that the user actually wants to query. In this embodiment of this application, the query field corresponding to the to-be-queried text is determined based on the relationship information of the to-be-queried object in the to-be-queried object set. The to-be-queried object set is determined, so that the information that the user actually wants to query can be determined, to help improve accuracy of the query field corresponding to the to-be-queried text, and help obtain, through query, a query result that matches a user intention.

In an implementation, the to-be-queried object may be an entity that is in the preset database and that corresponds to a word in the to-be-queried text. For example, when the to-be-queried text is "Guo Degang's Water Margin", the to-be-queried object set may include two to-be-queried objects (for example, a character "Guo Degang" and a crosstalk "Water Margin"). The character "Guo Degang" is an entity that is in the preset database and that corresponds to the word "Guo Degang" in the to-be-queried text, and the crosstalk "Water Margin" is an entity that is in the preset database and that corresponds to the word "Water Margin" in the to-be-queried text. In an implementation, the to-be-queried object may be a second entity obtained through inference based on a first entity, and the first entity is an entity that is in the preset database and that corresponds to a word in the to-be-queried text. For example, the to-be-queried text is "a work of Deng Chao's wife" a first entity that is in the preset database and that corresponds to a word "Deng Chao" in the to-be-queried text is a character "Deng Chao", and the character "Deng Chao" is connected to a character "Sun Li" in the preset database by using a conjugal relationship. Therefore, it can be learned, through inference, that the second entity is the character "Sun Li".

The preset database may be a local database in the serving device, or may be a cloud database. This is not limited in this embodiment of this application. In this embodiment of this application, a knowledge graph may be stored in the preset database. Specifically, the serving device may determine, from the knowledge graph in the preset database, the to-be-queried object set corresponding to the to-be-queried text. In this embodiment of this application, the preset database may be specifically the knowledge graph in the preset database. It should be noted that, in this embodiment of this application, that the to-be-queried object set corresponding to the to-be-queried text is determined from the knowledge graph is used as an example for description, but does not constitute a limitation on this embodiment of this application. In another feasible implementation, the serving device may alternatively determine, from a knowledge organization structure that is not a knowledge graph, the to-be-queried object set corresponding to the to-be-queried text. The knowledge organization structure is used to store a plurality of objects and a relationship between the objects, and the knowledge organization structure is stored in the preset database.

Step S203: The serving device determines the relationship information of the to-be-queried object in each to-be-queried object set from preset relationship information between two objects.

Specifically, after determining, from the preset database, the to-be-queried object set corresponding to the to-be-queried text, the serving device may determine, from the preset relationship information between two objects, the relationship information of the to-be-queried object in each to-be-queried object set, and further determine, based on the relationship information of the to-be-queried object in each to-be-queried object set, the query field corresponding to the to-be-queried text.

In this embodiment of this application, the preset relationship information between two objects may be stored in the preset database. When two nodes in the knowledge graph are connected by using one edge, relationship information between entities corresponding to the two nodes may be stored in the preset database. Relationship information between two objects may be a relationship between nodes in the knowledge graph that correspond to the two objects. For example, when the two objects are respectively the character "Guo Degang" and the crosstalk "Water Margin", relationship information between the character "Guo Degang" and the crosstalk "Water Margin" may be a creation relationship or a performance relationship (it is assumed that the crosstalk "Water Margin" is created or performed by Guo Degang).

It should be noted that in this embodiment of this application, the node, the entity, and the object in the preset database (for example, the knowledge graph in the preset database) are equivalent to a same concept. The relationship information of the to-be-queried object in each to-be-queried object set is relationship information between the to-be-queried object and another object that is in all objects in the knowledge graph and that is different from the to-be-queried object. A node corresponding to the another object in the knowledge graph is connected, by using an edge, to a node corresponding to the to-be-queried object in the knowledge graph. In other words, the another object and the to-be-queried object have an association relationship in the knowledge graph.

The relationship information of the to-be-queried object may include relationship information between the to-be-queried object and one or more objects. In an implementation, the relationship information of the to-be-queried object may include relationship information between the to-be-queried object and all objects, or relationship information between the to-be-queried object and some objects in all the objects. All the objects are all objects that have an association relationship with the to-be-queried object in the knowledge graph. For example, if a node corresponding to a to-be-queried object 1 is separately connected to 10 nodes in the knowledge graph by using different edges. In other words, the to-be-queried object 1 has an association relationship with the 10 objects. In this case, all the objects include the 10 objects, and the some objects are some objects in the 10 objects.

Specifically, if the to-be-queried object set includes one to-be-queried object, the serving device may obtain relationship information between all objects associated with the to-be-queried object and the to-be-queried object. If the to-be-queried object set includes a plurality of to-be-queried objects, the serving device may obtain relationship information between all objects associated with each to-be-queried object in the to-be-queried object set and the to-be-queried object. For example, if the to-be-queried object set includes four to-be-queried objects (for example, a to-be-queried object 1, a to-be-queried object 2, a to-be-queried object 3, and a to-be-queried object 4), and a relationship between the four to-be-queried objects in the knowledge graph is as follows: the to-be-queried object 1 is associated with each of the to-be-queried object 2, the to-be-queried object 3, and an object 5 (the object 5 is an entity in the knowledge graph), and the to-be-queried object 3 is associated with the to-be-queried object 4. In this case, the relationship information obtained by the serving device may include relationship information between the to-be-queried object 1 and the to-be-queried object 2, relationship information between the to-be-queried object 1 and the to-be-queried object 3, and relationship information between the to-be-queried object 3 and the to-be-queried object 4. It can be learned that, when obtaining relationship information of the to-be-queried object 1, the serving device may obtain relationship information between all objects (to be specific, the to-be-queried object 2 and the to-be-queried object 3) associated with the to-be-queried object 1 in the to-be-queried object set and the to-be-queried object 1, and does not need to obtain relationship information between the to-be-queried object 1 and another object (the object 5) that does not belong to the to-be-queried object set.

In this embodiment of this application, the preset relationship information between two objects may be automatically captured from a network, and may be updated in real time. The preset relationship information between two objects may be generated and maintained without manual participation. Therefore, efficiency of determining the relationship information of the to-be-queried object in each to-be-queried object set from the preset relationship information between two objects can be higher, and timeliness of the determined relationship information of the to-be-queried object can be ensured.

Step S204: The serving device determines, based on the relationship information of the to-be-queried object in each to-be-queried object set, the query field corresponding to the to-be-queried text.

Specifically, after determining the relationship information of the to-be-queried object in each to-be-queried object set, the serving device may determine, based on the relationship information of the to-be-queried object in each to-be-queried object set, the query field corresponding to the to-be-queried text.

In this embodiment of this application, the serving device may preset a supported field, and the serving device may support one or more fields. In this embodiment of this application, that the serving device supports a plurality of fields is used as an example for description. It should be noted that, that the serving device supports a plurality of fields indicates that the serving device may obtain a resource in each supported field. Specifically, the resource in the field supported by the serving device may be stored in the serving device, or may be stored in a cloud server corresponding to each field. This is not limited in this embodiment of this application. In this embodiment of this application, there may be one or more query fields corresponding to the to-be-queried text.

The serving device may determine, based on the relationship information of the to-be-queried object in each to-be-queried object set, a resource that is in a specific field in a plurality of supported fields and that the user actually wants to access when the user enters the to-be-queried text, further use, as the query field corresponding to the to-be-queried text, a field that the user actually wants to access, and perform query only on a serving device corresponding to the query field, to help reduce query result redundancy. The serving device corresponding to the query field may be a data server.

In an implementation, after determining, based on the relationship information of the to-be-queried object in each to-be-queried object set, the query field corresponding to the to-be-queried text, the serving device may further send, to the serving device corresponding to the query field, text information corresponding to any to-be-queried object set. After receiving the text information corresponding to the to-be-queried object set, the serving device corresponding to the query field may obtain a query result based on the text information, and send the query result to the serving device. After receiving the query result from the serving device corresponding to the query field, the serving device may output the query result.

Text information corresponding to each to-be-queried object set may include a word corresponding to a to-be-queried object in the to-be-queried object set. For example, when the to-be-queried objects in the $1^{st}$ to-be-queried object set includes the character "Guo Degang" and the crosstalk "Water Margin" and the to-be-queried objects in the $2^{nd}$ to-be-queried object set includes the character "Guo Degang" and the television drama "Water Margin", text information corresponding to the $1^{st}$ to-be-queried object set and text information corresponding to the $2^{nd}$ to-be-queried object set each may be "Guo Degang" and "Water Margin". It should be noted that all to-be-queried object sets correspond to same text information. Therefore, the serving device sends, to the serving device corresponding to the query field, the text information corresponding to the any to-be-queried object set, to obtain a query result required by the user.

The text information corresponding to the to-be-queried object set is sent to only the serving device corresponding to the query field, so that the user can obtain the required query result, and extra overheads caused by sending the text information corresponding to the to-be-queried object set to serving devices corresponding to all fields supported by the serving device can be avoided. In addition, some query results that are not required by the user are prevented from being found, to help reduce query result redundancy.

It should be noted that the serving device corresponding to the query field and the serving device that determines the query field may be a same device, or may be different devices. When the serving device corresponding to the query field and the serving device that determines the query field are different devices, after the serving device determines the query field corresponding to the to-be-queried text, the serving device sends, to the serving device corresponding to the query field, the text information corresponding to the to-be-queried object set. This is only used as an example for description, but does not constitute a limitation on this embodiment of this application. When the serving device corresponding to the query field and the serving device that determines the query field are a same device, the serving device may obtain, from a database corresponding to the query field, the query result based on the text information corresponding to the any to-be-queried object set. Resources corresponding to different fields supported by the serving device may be stored in different local databases of the serving device. According to this manner, querying databases corresponding to all fields supported by the serving device can be avoided, and only the database corresponding to the query field needs to be queried, to ensure that the query result required by the user can be obtained, improve query efficiency, and reduce query result redundancy.

In an implementation, the serving device may obtain one or more query results. When there are a plurality of query results, after obtaining the query results, the serving device may further perform ranking processing on the query results, and output the ranked query results Ranking processing is performed on the query results, to preferentially output a query result that better meets a search requirement of the user. In other words, the query result that better meets the search requirement of the user is ranked with a higher priority and displayed to the user, to effectively improve an intelligent search effect.

According to this embodiment of this application, the resource that is in the specific field in the plurality of fields supported by the serving device and that the user actually wants to access when the user enters the to-be-queried text may be determined based on the relationship information of the to-be-queried object in each to-be-queried object set, the field that the user actually wants to access is further used as the query field corresponding to the to-be-queried text, and query is performed only on the serving device corresponding to the query field. Compared with a manner of querying the serving devices corresponding to all the fields supported by the serving device, in an instance in this application, a quantity of query fields can be reduced. In other words, a query range can be reduced. Therefore, the query result that matches the user intention can be obtained through query. In addition, this helps improve query efficiency and reduce query result redundancy.

Figure 3:
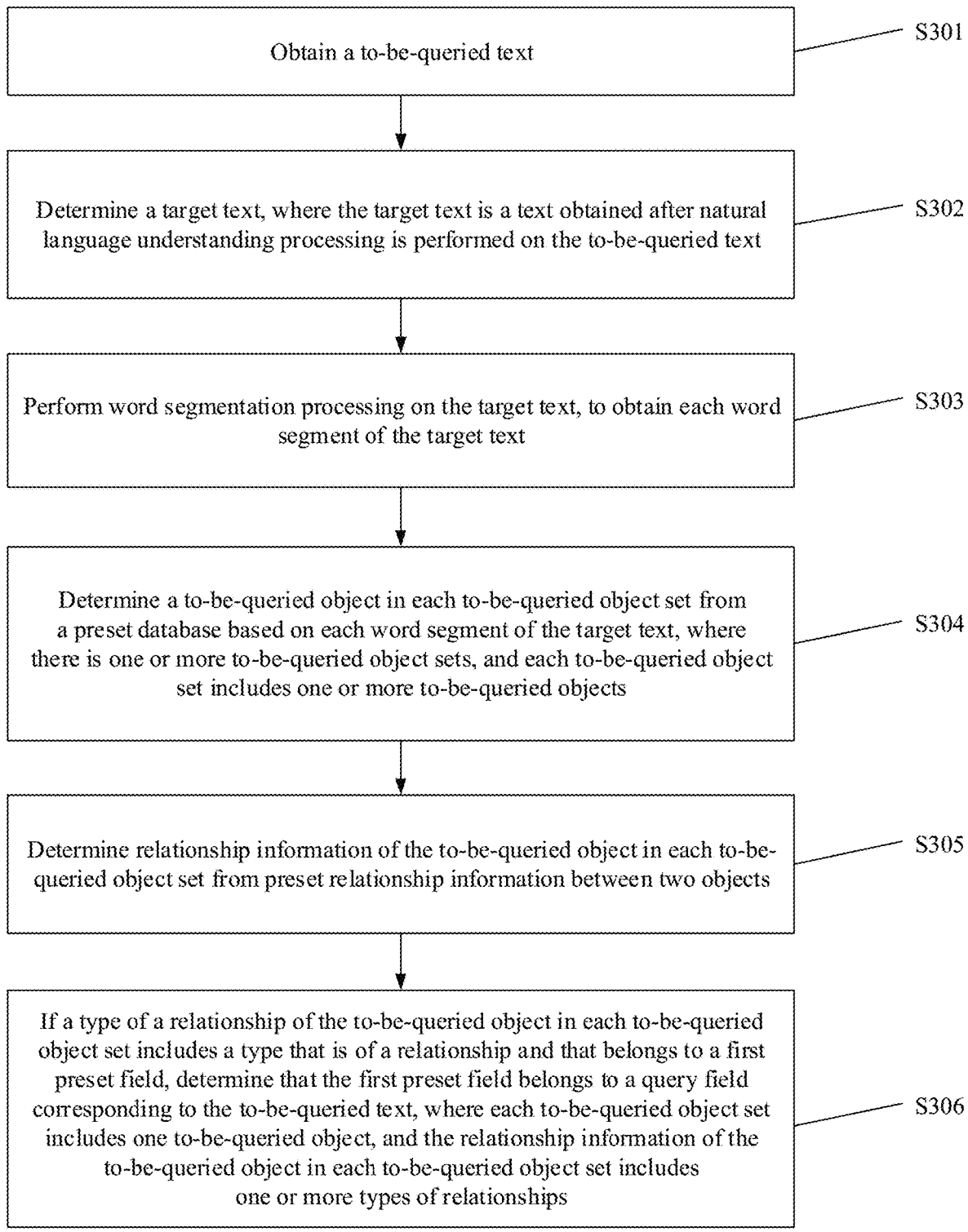
FIG. 3 is a schematic flowchart of another data processing method according to an embodiment of this application.

FIG. 3 is a schematic flowchart of another data processing method according to an embodiment of this application. In this method, how to determine, from a preset database, a to-be-queried object set corresponding to a to-be-queried text and how to determine, based on relationship information of a to-be-queried object in each to-be-queried object set when the to-be-queried object set includes one to-be-queried object, a query field corresponding to the to-be-queried text are described in detail. Steps S301 to S306 are performed by a serving device or a chip in the serving device. That the serving device performs the data processing method is used as an example for description below. As shown in FIG. 3, the method may include but is not limited to the following steps.

Step S301: The serving device obtains a to-be-queried text.

It should be noted that, for an execution process of step S301, refer to the specific description of step S201 in FIG. 2. Details are not described herein again Step S302: The serving device determines a target text, where the target text is a text obtained after natural language understanding NLU processing is performed on the to-be-queried text.

Specifically, after obtaining the to-be-queried text, the serving device may perform NLU processing on the to-be-queried text, to obtain the target text. The target text may be a phrase. One or more target texts may be obtained by processing the to-be-queried text. For example, when the to-be-queried text is "Guo Degang's Water Margin", one phrase is obtained after NLU processing is performed on the to-be-queried text, and the phrase is "Guo Degang's Water Margin". For another example, when the to-be-queried text is "Water Margin of Guo Qilin's father", two phrases are obtained after NLU processing is performed on the to-be-queried text, and the two phrases are respectively "Guo Qilin's father" and "Water Margin". For still another example, when the to-be-queried text is "a work of Deng Chao's wife", one phrase is obtained after NLU processing is performed on the to-be-queried text, and the phrase is "Deng Chao's wife".

Step S303: The serving device performs word segmentation processing on the target text, to obtain each word segment of the target text.

Specifically, after determining the target text, the serving device may separately perform word segmentation processing on each target text, to obtain each word segment of each target text.

In an implementation, the serving device may invoke a word segmentation algorithm to perform word segmentation processing on the target text, to obtain each word segment of the target text. In an implementation, the word segmentation algorithm may include but is not limited to a string matching-based word segmentation algorithm (for example, a forward maximum matching algorithm, a backward maximum matching algorithm, a minimum-cut word segmentation algorithm, or a bidirectional maximum matching algorithm), an understanding-based word segmentation algorithm, and a statistical-based word segmentation algorithm. This is not limited in this embodiment of this application.

For example, when two target texts are respectively "Guo Qilin's father" and "Water Margin", word segments obtained after word segmentation processing is performed on "Guo Qilin's father" includes "Guo Qilin" and "father", and a word segment obtained after word segmentation processing is performed on "Water Margin" includes "Water Margin".

Step S304: The serving device determines the to-be-queried object in each to-be-queried object set from the preset database based on each word segment of the target text, where there is one or more to-be-queried object sets, and each to-be-queried object set includes one or more to-be-queried objects.

Specifically, after obtaining each word segment of the target text, the serving device may determine the to-be-queried object in each to-be-queried object set from the preset database based on each word segment of the target text.

In this embodiment of this application, one word segment may correspond to one or more objects (namely, entities) in the preset database, or may correspond to no object (namely, no entity). It should be noted that, quantities of objects in the preset database that correspond to different word segments of a same target text are independent of each other. For example, when the target text is "Guo Qilin's father", the target text includes two word segments (namely, "Guo Qilin" and "father"). The word segment "Guo Qilin" may correspond to one entity (for example, a character "Guo Qilin") in the preset database, and the word segment "father" may correspond to no entity in the preset database.

It should be noted that, at least one to-be-queried object may be determined from the preset database based on a word segment of each target text. The to-be-queried object may be an entity that is in the preset database and that corresponds to one word segment of the target text, or may be an entity obtained through inference based on the entity that is in the preset database and that corresponds to one word segment of the target text and another word segment of the target text other than the word segment.

In an implementation, each word segment of the target text corresponds to an object in the preset database; and a specific implementation of the step in which the serving device determines the to-be-queried object in each to-be-queried object set from the preset database based on each word segment of the target text may be: using, as to-be-queried objects in different to-be-queried object sets, different objects in the preset database that correspond to each word segment of the target text. For example, when the target text is "Water Margin", the target text includes only one word segment (namely, "Water Margin"). If the word segment corresponds to two different objects in the preset database, when the two objects are respectively a crosstalk "Water Margin" and a television drama "Water Margin", the serving device may use the crosstalk "Water Margin" as a to-be-queried object in a first to-be-queried object set, and use the television drama "Water Margin" as a to-be-queried object in a second to-be-queried object set. The first to-be-queried object set and the second to-be-queried object set are different to-be-queried object sets.

In an implementation, if the target text includes only one word segment, the word segment corresponds to only one object in the preset database, and there are N to-be-queried object sets, the serving device may use, as a to-be-queried object in the N to-be-queried object sets, the object that is in the preset database and that corresponds to the word segment.

In an implementation, there is a same quantity of to-be-queried objects in each to-be-queried object set, and the quantity of to-be-queried objects in the to-be-queried object set may be a quantity of target texts obtained after NLU processing is performed on the to-be-queried text. For example, when the to-be-queried text is "Water Margin of Guo Qilin's father", two target texts (namely, "Guo Qilin's father" and "Water Margin") may be obtained after NLU processing is performed on the to-be-queried text, and to-be-queried objects in a to-be-queried object set corresponding to the to-be-queried text may include a character "Guo Degang" and a crosstalk "Water Margin" (or the character "Guo Degang" and a television drama "Water Margin"). In other words, there are two to-be-queried objects in the to-be-queried object set corresponding to the to-be-queried text.

In an implementation, the word segment of the target text may include at least one first word segment and one second word segment, the first word segment corresponds to a first object in the preset database, and the second word segment corresponds to no object in the preset database; and a specific implementation of the step in which the serving device determines the to-be-queried object in each to-be-queried object set from the preset database based on each word segment of the target text may be: determining relationship information of the first object from the preset relationship information between two objects; determining, from the relationship information of the first object, first relationship information that has a matching relationship with the second word segment; determining a target object based on a second object if the first object is connected to the second object based on the first relationship information in the preset database; and using the target object as the to-be-queried object in each to-be-queried object set.

The relationship information of the first object may include a relationship between the first object and each of a plurality of objects, or include a type of a relationship between the first object and each of a plurality of objects. Each of the plurality of objects is an object that has an association relationship with the first object in the preset database. For example, when the first object is the character "Guo Qilin", and the character "Guo Qilin" has an association relationship with two objects (for example, the character "Guo Degang" and a comedy program "Top Funny Comedian") in the preset database, a relationship between the character "Guo Degang" and the character "Guo Qilin" may be a father-son relationship, and a type of the relationship may be a relative. A relationship between the character "Guo Qilin" and the comedy program "Top Funny Comedian" may be a program-guest relationship, and the type of the relationship may be a program.

That the first relationship information in the relationship information of the first object and the second word segment have a matching relationship may indicate that the first relationship information and the second word segment are synonyms. For example, when a target word segment is "Guo Qilin's father", a first word segment in the target word segment is "Guo Qilin", a second word segment is "father", and a first object that is in the preset database and that corresponds to the first word segment is the character "Guo Qilin", if the character "Guo Qilin" has an association relationship with two objects (for example, the character "Guo Degang" and the comedy program "Top Funny Comedian") in the preset database, the relationship between the character "Guo Qilin" and the character "Guo Degang" is a father-son relationship, and the relationship between the character "Guo Qilin" and the comedy program "Top Funny Comedian" is a program-guest relationship, because "father" (namely, the second word segment) and a father-son relationship in relationship information of the character "Guo Qilin" are synonyms, the "father-son" relationship can be used as the first relationship information; and because the character "Guo Qilin" and the character "Guo Degang" are connected based on the first relationship information in the preset database (namely, the "father-son" relationship), the character "Guo Degang" can be determined as the second object.

In an implementation, if the target text includes one first word segment and one second word segment, the serving device may use the second object as the target object. In other words, the second object is used as the to-be-queried object in each to-be-queried object set.

In an implementation, if the target text includes one first word segment and a plurality of second word segments, the serving device may determine the target object based on the second object, and use the target object as the to-be-queried object in each to-be-queried object set. Specifically, the serving device may determine the target object based on the second object and a second word segment in the plurality of second word segments other than a word segment used for determining the second object. For example, if the target text is "a father of an elder brother of a younger brother of Guo Qilin", the target text includes one first word segment (namely, "Guo Qilin") and three second word segments ("younger brother", "elder brother", "father"). The second object determined based on the first word segment and the $1^{st}$ second word segment (namely, "younger brother") is a character "Guo Fenyang". A third object determined based on the character "Guo Fenyang" and the $2^{nd}$ second word segment (namely, "elder brother") is the character "Guo Qilin". A fourth object determined based on the character "Guo Qilin" and the $3^{rd}$ second word segment (namely, "father") is the character "Guo Degang". After all the second word segments of the target text are used to determine an object, a finally obtained object (namely, the fourth object) may be used as the target object. According to this manner, multi-level inference (for example, three-level inference is implemented in the foregoing example) can be implemented, to help determine an object (namely, the target object) that the user actually needs to query.

Step S305: The serving device determines the relationship information of the to-be-queried object in each to-be-queried object set from the preset relationship information between two objects.

It should be noted that, for an execution process of step S305, refer to the specific description of step S203 in FIG. 2. Details are not described herein again Step S306: If a type of a relationship of the to-be-queried object in each to-be-queried object set includes a type that is of a relationship and that belongs to a first preset field, the serving device determines that the first preset field belongs to the query field corresponding to the to-be-queried text, where each to-be-queried object set includes one to-be-queried object, and the relationship information of the to-be-queried object in each to-be-queried object set includes one or more types of relationships.

Specifically, when each to-be-queried object set includes one to-be-queried object, if the type of a relationship of the to-be-queried object in each to-be-queried object set includes the type that is of a relationship and that belongs to the first preset field, the serving device may determine that the first preset field belongs to the query field corresponding to the to-be-queried text.

There may be one or more first preset fields, and the first preset field may be one or more of a plurality of fields supported by the serving device. To be specific, the serving device may first determine, based on a preset correspondence between a type of a relationship and a preset field, a field to which the type of a relationship of the to-be-queried object in the to-be-queried object set belongs. If the field is any one or more fields in the fields supported by the serving device, the serving device may determine that the one or more fields belong to the query field corresponding to the to-be-queried text.

It should be noted that types of relationships of to-be-queried objects in different to-be-queried object sets may include types that are of relationships and that belong to different first preset fields. For example, when the serving device supports three fields (for example, a film and television field, a music field, and an audio field), the to-be-queried text corresponds to two to-be-queried object sets, and the two to-be-queried object sets include one to-be-queried object, types of relationships of to-be-queried objects in the $1^{st}$ to-be-queried object set may include types that are of relationships and that belong to two fields: the film and television field and the music field, and a type of a relationship of a to-be-queried object in the $2^{nd}$ to-be-queried object set may include a type that is of a relationship and that belongs to the audio field. In other words, first preset fields corresponding to the $1^{st}$ to-be-queried object set includes the film and television field and the music field, a first preset field corresponding to the $2^{nd}$ to-be-queried object set includes the audio field, and the $1^{st}$ to-be-queried object set and the $2^{nd}$ to-be-queried object set correspond to different first preset fields. The query field corresponding to the to-be-queried text includes a first preset field corresponding to each to-be-queried object set. In other words, the query field corresponding to the to-be-queried text includes three fields: the film and television field, the music field, and the audio field.

In an actual case, an entity (namely, an object) may have a large quantity of relationships in a knowledge graph. The relationships are classified, so that the large quantity of relationships can be divided into a small quantity of types of relationships. In addition, the query field corresponding to the to-be-queried text can also be determined based on a type of a relationship of the entity. Compared with a manner of determining, based on the type of a relationship of the entity, the query field corresponding to the to-be-queried text, in this technical solution in which the query field corresponding to the to-be-queried text is determined based on the type of a relationship of the entity, efficiency of determining the query field corresponding to the to-be-queried text can be improved.

In this embodiment of this application, the relationship information of the to-be-queried object in each to-be-queried object set may include a plurality of types of relationships. For example, when the to-be-queried object set includes one to-be-queried object (for example, "Guo Degang"), the to-be-queried object may be connected to an object 1 (for example, the crosstalk "Water Margin") in the knowledge graph by using a creation relationship and/or a performance relationship, and may also be connected to an object 2 (for example, a film "Getting Home") by using the performance relationship. A type of the creation relationship belongs to the film and television field or the audio field, and a type of the performance relationship belongs to the film and television field. In this case, the relationship information of the to-be-queried object may include the type of the creation relationship and the type of the performance relationship.

It should be noted that, in this embodiment of this application, the query field corresponding to the to-be-queried text may alternatively be determined based on a relationship of the to-be-queried object in the to-be-queried object set. Specifically, the serving device may determine a field to which the relationship of the to-be-queried object in the to-be-queried object set belongs. If the field is any one or more fields in the fields supported by the serving device, the serving device may determine that the one or more fields belong to the query field corresponding to the to-be-queried text.

It should be further noted that, in this embodiment of this application, not only the query field corresponding to the to-be-queried text may be determined based on the knowledge graph, but also the relationship information of the to-be-queried object may be obtained from the knowledge graph. The relationship information belongs to the query field corresponding to the to-be-queried text. In other words, in this embodiment of this application, an interpretable field check function can be provided, so that not only the query field corresponding to the to-be-queried text can be determined, but also a specific relationship that is used to associate to-be-queried objects in the query field can be determined. For example, when the to-be-queried text is "Guo Degang's Water Margin", it is determined that the query field corresponding to the query text is the film and television field, and it can also be determined that the to-be-queried object, namely, the character "Guo Degang" and the crosstalk "Water Margin" are associated based on the creation relationship that belongs to the film and television field.

According to this embodiment of this application, the resource that is in the specific field in the plurality of fields supported by the serving device and that the user actually wants to access when the user enters the to-be-queried text may be determined based on the type of a relationship of the to-be-queried object in each to-be-queried object set, the field that the user actually wants to access is further used as the query field corresponding to the to-be-queried text, and query is performed only on the serving device corresponding to the query field. Compared with a manner of querying the serving devices corresponding to all the fields supported by the serving device, in an instance in this application, a quantity of query fields can be reduced. In other words, a query range can be reduced. Therefore, a query result that matches a user intention can be obtained through query. In addition, this helps improve query efficiency and reduce query result redundancy. In addition, compared with the manner of determining, based on the relationship of the to-be-queried object, the query field corresponding to the to-be-queried text, in this technical solution in which the query field corresponding to the to-be-queried text is determined based on the type of a relationship of the to-be-queried object, efficiency of determining the query field corresponding to the to-be-queried text can be improved.

Figure 4:
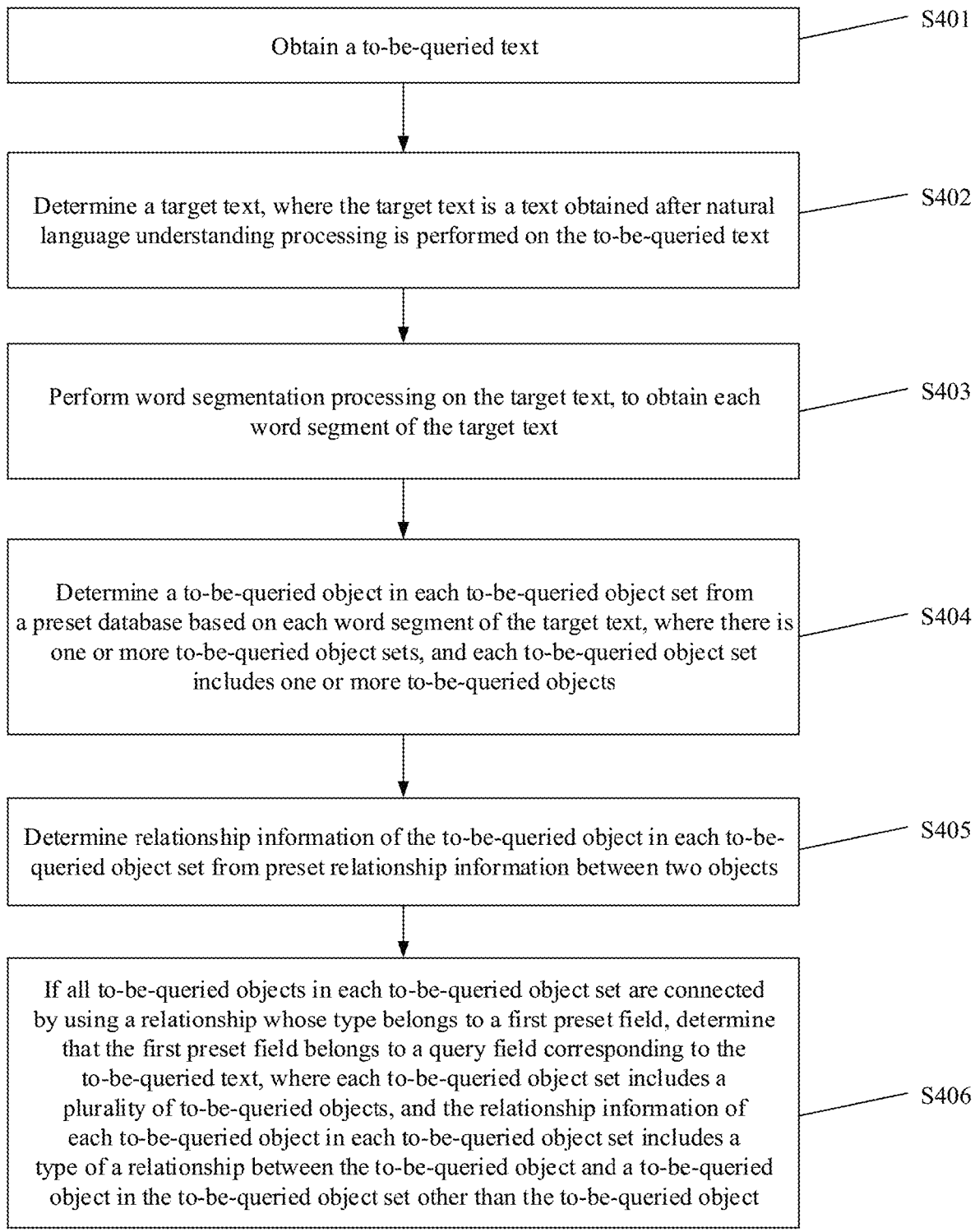
FIG. 4 is a schematic flowchart of still another data processing method according to an embodiment of this application.

FIG. 4 is a schematic flowchart of still another data processing method according to an embodiment of this application. In this method, how to determine, based on relationship information of a to-be-queried object in each to-be-queried object set when each to-be-queried object set includes a plurality of to-be-queried objects, a query field corresponding to a to-be-queried text is described in detail. Steps S401 to S406 are performed by a serving device or a chip in the serving device. That the serving device performs the data processing method is used as an example for description below. As shown in FIG. 4, the method may include but is not limited to the following steps.

Step S401: The serving device obtains a to-be-queried text.

It should be noted that, for an execution process of step S401, refer to the specific description of step S201 in FIG. 2. Details are not described herein again Step S402: The serving device determines a target text, where the target text is a text obtained after natural language understanding NLU processing is performed on the to-be-queried text.

Step S403: The serving device performs word segmentation processing on the target text, to obtain each word segment of the target text.

Step S404: The serving device determines a to-be-queried object in each to-be-queried object set from a preset database based on each word segment of the target text, where there is one or more to-be-queried object sets, and each to-be-queried object set includes one or more to-be-queried objects.

Step S405: The serving device determines relationship information of the to-be-queried object in each to-be-queried object set from preset relationship information between two objects.

It should be noted that, for an execution process of steps S402 to S405, respectively refer to the specific descriptions of steps S302 to S304 in FIG. 3 and step S203 in FIG. 2. Details are not described herein again.

Step S406: If all to-be-queried objects in each to-be-queried object set are connected by using a relationship whose type belongs to a first preset field, the serving device determines that the first preset field belongs to a query field corresponding to the to-be-queried text, where each to-be-queried object set includes a plurality of to-be-queried objects, and relationship information of each to-be-queried object in each to-be-queried object set includes a type of a relationship between the to-be-queried object and a to-be-queried object in the to-be-queried object set other than the to-be-queried object.

When each to-be-queried object set includes a plurality of to-be-queried objects, the relationship information of each to-be-queried object in the to-be-queried object set may include a type of a relationship between the to-be-queried object and a to-be-queried object in the to-be-queried object set other than the to-be-queried object. For example, when the to-be-queried text is "Guo Degang's Water Margin", to-be-queried objects in a to-be-queried object set corresponding to the to-be-queried text include a character "Guo Degang" and a crosstalk "Water Margin", and the character "Guo Degang" has an association relationship with two objects (for example, the crosstalk "Water Margin" and a character "Guo Qilin") in a knowledge graph, relationship information that is of the character "Guo Degang" and that is obtained by the serving device may include a type of a relationship between the character "Guo Degang" and the crosstalk "Water Margin". In other words, the serving device may not obtain a type of a relationship between the character "Guo Degang" and the character "Guo Qilin" (the character "Guo Qilin" is an object that does not belong to the to-be-queried object set). Therefore, only the type of the relationship between the character "Guo Degang" and the crosstalk "Water Margin" may be used to determine the query field corresponding to the to-be-queried text.

When each to-be-queried object set includes a plurality of to-be-queried objects, a specific implementation in which the serving device determines, based on the relationship information of the to-be-queried object in the to-be-queried object set, the query field corresponding to the to-be-queried text may be: determining whether all to-be-queried objects in each to-be-queried object set are connected in the preset database; if the to-be-queried objects are connected, further determining, based on a preset correspondence between a type of a relationship and a preset field, whether the to-be-queried objects in the to-be-queried object set are connected by using relationships whose types belong to a same field; and if the to-be-queried objects in the to-be-queried object set are connected by using the relationships whose types belong to the same field and the same field is one or more fields in a plurality of fields supported by the serving device, determining that the one or more fields belong to the query field corresponding to the to-be-queried text.

If the to-be-queried objects in the to-be-queried object set are not connected in the preset database, it indicates that the query field corresponding to the to-be-queried text cannot be determined based on the to-be-queried object set. In this case, the serving device may determine, based on another to-be-queried object set, the query field corresponding to the to-be-queried text. For example, if the to-be-queried text is "Guo Degang's Water Margin", and the to-be-queried text corresponds to two to-be-queried object sets, to-be-queried objects in the $1^{st}$ to-be-queried object set may include a character "Guo Degang" and a television drama "Water Margin", and to-be-queried objects in the $2^{nd}$ to-be-queried object set may include the character "Guo Degang" and a crosstalk "Water Margin". If the character "Guo Degang" and the television drama "Water Margin" have no association relationship in the preset database, in other words, a node corresponding to the character "Guo Degang" in the knowledge graph of the preset database and a node corresponding to the television drama "Water Margin" in the knowledge graph of the preset database are not connected by using an edge, the serving device may determine, based on the $2^{nd}$ to-be-queried object set, the query field corresponding to the to-be-queried text. The character "Guo Degang" and the crosstalk "Water Margin" in the $2^{nd}$ to-be-queried object set are connected in the preset database by using a creation relationship, and a type of the creation relationship belongs to an audio field. If the fields supported by the serving device include a film and television field, a music field, and an audio field, the serving device may use the audio field as the query field corresponding to the to-be-queried text.

If the to-be-queried objects in the to-be-queried object set are not connected by using the relationships whose types belong to a same field, it indicates that the query field corresponding to the to-be-queried text cannot be determined based on the to-be-queried object set. In this case, the serving device may determine, based on another to-be-queried object set, the query field corresponding to the to-be-queried text.

There may be one or more first preset fields, and the first preset field may be one or more of the plurality of fields supported by the serving device.

According to this embodiment of this application, when each to-be-queried object set includes a plurality of to-be-queried objects, a resource that is in a specific field in the plurality of fields supported by the serving device and that a user actually wants to access when the user enters the to-be-queried text may be determined based on the type of a relationship of the to-be-queried object in each to-be-queried object set, further, a field that the user actually wants to access is used as the query field corresponding to the to-be-queried text, and query is performed only on a serving device corresponding to the query field. Compared with a manner of querying the serving devices corresponding to all the fields supported by the serving device, in an instance in this application, a quantity of query fields can be reduced. In other words, a query range can be reduced. Therefore, a query result that matches a user intention can be obtained through query. In addition, this helps improve query efficiency and reduce query result redundancy. In addition, compared with a manner of determining, based on the relationship of the to-be-queried object, the query field corresponding to the to-be-queried text, in this technical solution in which the query field corresponding to the to-be-queried text is determined based on the type of a relationship of the to-be-queried object, efficiency of determining the query field corresponding to the to-be-queried text can be improved.

The foregoing describes in detail the method in the embodiments of this application. The following provides an apparatus in the embodiments of this application.

Figure 5:
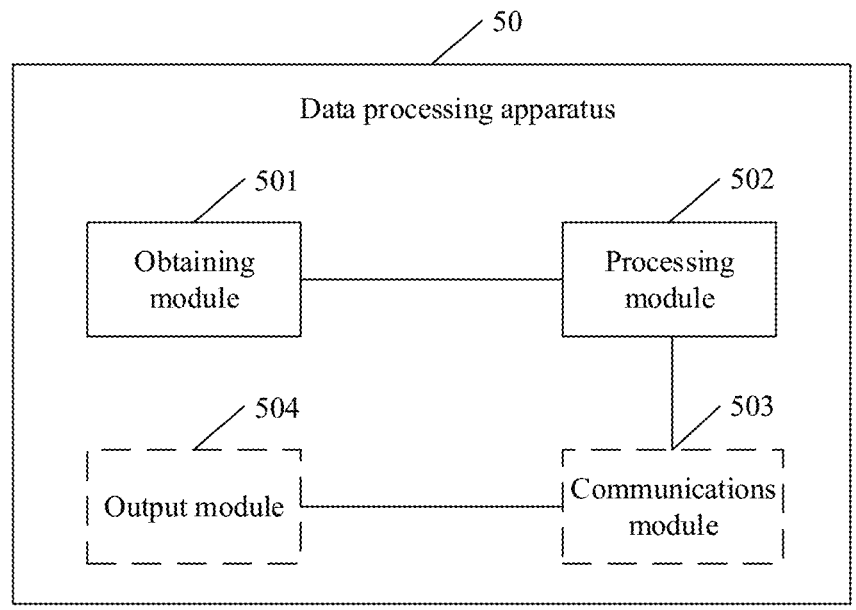
FIG. 5 is a schematic diagram of a structure of a data processing apparatus according to an embodiment of this application.

FIG. 5 is a schematic diagram of a structure of a data processing apparatus according to an embodiment of this application. The data processing apparatus may be a serving device or an apparatus (for example, a chip) used for the serving device. A data processing apparatus 50 is configured to perform steps performed by the serving device in the method embodiments corresponding to FIG. 2 to FIG. 4, and the data processing apparatus 50 may include:

an obtaining module 501, configured to obtain a to-be-queried text; and a processing module 502, configured to determine, from a preset database, a to-be-queried object set corresponding to the to-be-queried text, where there is one or more to-be-queried object sets, and each to-be-queried object set includes one or more to-be-queried objects.

The processing module 502 is further configured to determine relationship information of a to-be-queried object in each to-be-queried object set from preset relationship information between two objects; and The processing module 502 is further configured to determine, based on the relationship information of the to-be-queried object in each to-be-queried object set, a query field corresponding to the to-be-queried text.

In an implementation, each to-be-queried object set may include one to-be-queried object, and the relationship information of the to-be-queried object in each to-be-queried object set may include one or more types of relationships; and when the processing module 502 is configured to determine, based on the relationship information of the to-be-queried object in each to-be-queried object set, the query field corresponding to the to-be-queried text, the processing module 502 may be specifically configured to: if a type of a relationship of the to-be-queried object in each to-be-queried object set includes a type that is of a relationship and that belongs to a first preset field, determine that the first preset field belongs to the query field corresponding to the to-be-queried text.

In an implementation, each to-be-queried object set may include a plurality of to-be-queried objects, and relationship information of each to-be-queried object in each to-be-queried object set may include a type of a relationship between the to-be-queried object and a to-be-queried object in the to-be-queried object set other than the to-be-queried object; and when the processing module 502 is configured to determine, based on the relationship information of the to-be-queried object in each to-be-queried object set, the query field corresponding to the to-be-queried text, the processing module 502 may be specifically configured to: if all the to-be-queried objects in each to-be-queried object set are connected by using a relationship whose type belongs to a first preset field, determine that the first preset field belongs to the query field corresponding to the to-be-queried text.

In an implementation, when the processing module 502 is configured to determine, from the preset database, the to-be-queried object set corresponding to the to-be-queried text, the processing module 502 may be specifically configured to: determine a target text, where the target text is a text obtained after natural language understanding NLU processing is performed on the to-be-queried text; perform word segmentation processing on the target text, to obtain each word segment of the target text; and determine the to-be-queried object in each to-be-queried object set from the preset database based on each word segment of the target text.

In an implementation, each word segment of the target text corresponds to an object in the preset database; and when the processing module 502 is configured to determine the to-be-queried object in each to-be-queried object set from the preset database based on each word segment of the target text, the processing module 502 may be specifically configured to use, as to-be-queried objects in different to-be-queried object sets, different objects in the preset database that correspond to each word segment of the target text.

In an implementation, the word segment of the target text may include at least a first word segment and a second word segment, the first word segment corresponds to a first object in the preset database, and the second word segment corresponds to no object in the preset database; and when the processing module 502 is configured to determine the to-be-queried object in each to-be-queried object set from the preset database based on each word segment of the target text, the processing module 502 may be specifically configured to: determine relationship information of the first object from the preset relationship information between two objects; determine, from the relationship information of the first object, first relationship information that has a matching relationship with the second word segment; determine a target object based on a second object if the first object is connected to the second object based on the first relationship information in the preset database; and use the target object as the to-be-queried object in each to-be-queried object set.

In an implementation, the data processing apparatus 50 may further include a communications module 503 and an output module 504. The communications module 503 may be configured to send, to a serving device corresponding to the query field, text information corresponding to any to-be-queried object set. The communications module 503 may be further configured to receive a query result from the serving device corresponding to the query field. The output module 504 may be configured to output the query result.

Figure 6:
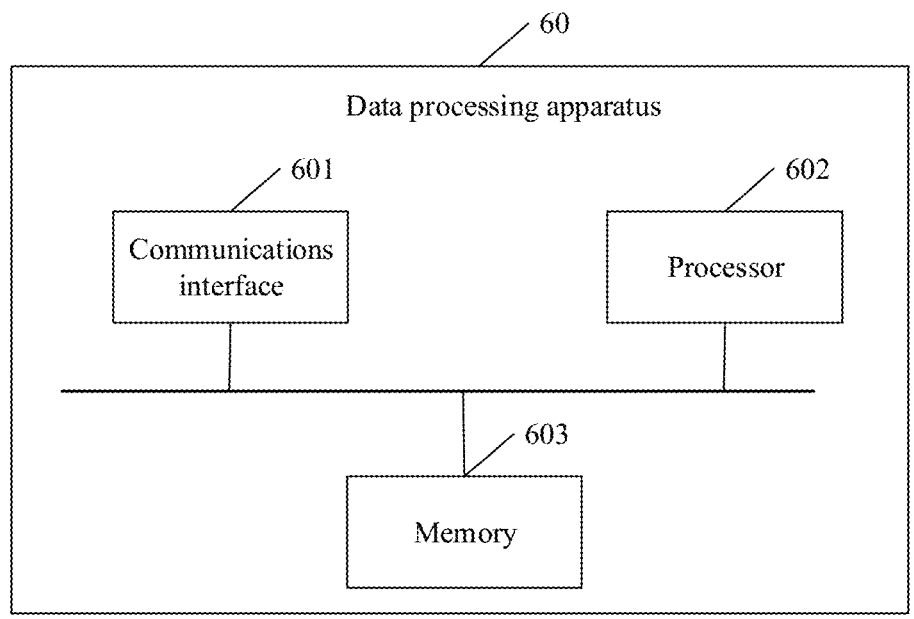
FIG. 6 is a schematic diagram of a structure of another data processing apparatus according to an embodiment of this application.

It should be noted that, for content that is not mentioned in the embodiment corresponding to FIG. 5 and a specific implementation of a step performed by each module, refer to the embodiments shown in FIG. 2 to FIG. 4 and the foregoing content. Details are not described herein again In an implementation, related functions implemented by the modules in FIG. 5 may be implemented through a combination of a processor and a communications interface. FIG. 6 is a schematic diagram of a structure of another data processing apparatus according to an embodiment of this application. The data processing apparatus may be a serving device or an apparatus (for example, a chip) used for the serving device. The data processing apparatus 60 may include a communications interface 601, a processor 602, and a memory 603. The communications interface 601, the processor 602, and the memory 603 may be connected to each other through one or more communications buses, or may be connected to each other in another manner. Related functions implemented by the obtaining module 501, the processing module 502, the communications module 503, and the output module 504 shown in FIG. 5 may be implemented by using a same processor 602, or may be implemented by using a plurality of different processors 602.

The communications interface 601 may be configured to: send data and/or signaling, and receive data and/or signaling. In this embodiment of this application, the communications interface 601 may be configured to send text information corresponding to any to-be-queried object set to a serving device corresponding to a query field. The communications interface 601 may be a transceiver.

The processor 602 is configured to perform a corresponding function of a serving device in the methods shown in FIG. 2 to FIG. 4. The processor 602 may include one or more processors. For example, the processor 602 may be one or more central processing units (central processing unit, CPU), a network processor (network processor, NP), a hardware chip, or any combination thereof. When the processor 602 is one CPU, the CPU may be a single-core CPU, or may be a multi-core CPU.

The memory 603 is configured to store program code, or the like. The memory 603 may include a volatile memory (volatile memory) such as a random access memory (random access memory, RAM), or the memory 603 may include a non-volatile memory (non-volatile memory) such as a read-only memory (read-only memory, ROM), a flash memory (flash memory), a hard disk drive (hard disk drive, HDD), or a solid-state drive (solid-state drive, SSD), or the memory 603 may include a combination of the foregoing types of memories.

The processor 602 may invoke program code stored in the memory 603, to perform the following operations:

obtaining a to-be-queried text;

determining, from a preset database, a to-be-queried object set corresponding to the to-be-queried text, where there is one or more to-be-queried object sets, and each to-be-queried object set includes one or more to-be-queried objects;

determining relationship information of a to-be-queried object in each to-be-queried object set from preset relationship information between two objects; and determining, based on the relationship information of the to-be-queried object in each to-be-queried object set, a query field corresponding to the to-be-queried text.

In an implementation, each to-be-queried object set may include one to-be-queried object, and the relationship information of the to-be-queried object in each to-be-queried object set may include one or more types of relationships; and when the processor 602 performs the operation of determining, based on the relationship information of the to-be-queried object in each to-be-queried object set, a query field corresponding to the to-be-queried text, the processor 602 may specifically perform the following operation: if a type of a relationship of the to-be-queried object in each to-be-queried object set includes a type that is of a relationship and that belongs to a first preset field, determining that the first preset field belongs to the query field corresponding to the to-be-queried text.

In an implementation, each to-be-queried object set may include a plurality of to-be-queried objects, and relationship information of each to-be-queried object in each to-be-queried object set may include a type of a relationship between the to-be-queried object and a to-be-queried object in the to-be-queried object set other than the to-be-queried object; and when the processor 602 performs the operation of determining, based on the relationship information of the to-be-queried object in each to-be-queried object set, a query field corresponding to the to-be-queried text, the processor 602 may specifically perform the following operation: if all the to-be-queried objects in each to-be-queried object set are connected by using a relationship whose type belongs to a first preset field, determining that the first preset field belongs to the query field corresponding to the to-be-queried text.

In an implementation, when the processor 602 performs the operation of determining, from a preset database, a to-be-queried object set corresponding to the to-be-queried text, the processor 602 may specifically perform the following operations: determining a target text, where the target text is a text obtained after natural language understanding NLU processing is performed on the to-be-queried text; performing word segmentation processing on the target text, to obtain each word segment of the target text; and determining the to-be-queried object in each to-be-queried object set from the preset database based on each word segment of the target text.

In an implementation, each word segment of the target text corresponds to an object in the preset database; and when the processor 602 performs the operation of determining the to-be-queried object in each to-be-queried object set from the preset database based on each word segment of the target text, the processor 602 may specifically perform the following operation: using, as to-be-queried objects in different to-be-queried object sets, different objects in the preset database that correspond to each word segment of the target text.

In an implementation, the word segment of the target text may include at least a first word segment and a second word segment, the first word segment corresponds to a first object in the preset database, and the second word segment corresponds to no object in the preset database; and when the processor 602 performs the operation of determining the to-be-queried object in each to-be-queried object set from the preset database based on each word segment of the target text, the processor 602 may specifically perform the following operations: determining relationship information of the first object from the preset relationship information between two objects; determining, from the relationship information of the first object, first relationship information that has a matching relationship with the second word segment; determining a target object based on a second object if the first object is connected to the second object based on the first relationship information in the preset database; and using the target object as the to-be-queried object in each to-be-queried object set.

In an implementation, the processor 602 may further perform the following operations: sending, to a serving device corresponding to the query field, text information corresponding to any to-be-queried object set; receiving a query result from the serving device corresponding to the query field; and outputting the query result.

Further, the processor 602 may further perform operations corresponding to the serving device in the embodiments shown in FIG. 2 to FIG. 4. For details, refer to descriptions in the method embodiments. Details are not described herein again An embodiment of this application further provides a computer-readable storage medium. The computer-readable storage medium may be configured to store computer software instructions used by the data processing apparatus in the embodiment shown in FIG. 5. The computer software instructions include a program designed for the serving device to execute the foregoing embodiments.

The computer-readable storage medium includes but is not limited to a flash memory, a hard disk, and a solid-state drive.

An embodiment of this application further provides a computer program product. When the computer product is run by a computing device, the method designed for the serving device in the embodiments in FIG. 2 to FIG. 4 may be performed.

An embodiment of this application further provides a chip, including a processor and a memory. The memory is configured to store a computer program, the processor is configured to invoke and run the computer program from the memory, and the computer program is configured to implement the methods in the foregoing method embodiments.

A person of ordinary skill in the art may be aware that, in combination with the examples described in the embodiments disclosed in this application, units and algorithm steps can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or the functions according to the embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    obtaining a to-be-queried text;
    performing natural language understanding (NLU) processing on the to-be-queried text to obtain a target text;
    performing word segmentation processing on the target text to obtain a first word segment of the target text and a second word segment of the target text;
    determining, from a preset database, one or more to-be-queried object sets corresponding to the to-be-queried text, wherein each of the one or more to-be-queried object sets comprises one or more to-be-queried objects, wherein the first word segment corresponds to a first object in the preset database, and wherein the second word segment does not correspond to an object in the preset database;
    determining, from preset relationship information, first relationship information of each of the to-be-queried objects in each of the to-be-queried object sets;
    determining second relationship information of the first object from the preset relationship information;
    determining, from the second relationship information, third relationship information that has a matching relationship with the second word segment;
    determining a target object based on the second object when the first object is connected to the second object based on the third relationship information in the preset database;
    setting the target object as the to-be-queried object; and
    determining, based on the to-be-queried object, a query field corresponding to the to-be-queried text.

2. The method of claim 1, wherein each of the to-be-queried object sets comprises one to-be-queried object, wherein the second relationship information of the to-be-queried object comprises one or more types of relationships, and wherein the method further comprises:
    determining whether a first type of a first relationship of the to-be-queried object includes a second type that is of a second relationship and that belongs to a first preset field; and
    determining that the first preset field belongs to the query field when the first type includes the second type.

3. The method of claim 1, wherein each of the to-be-queried object sets comprises a plurality of to-be-queried objects, wherein the second relationship information of each of the to-be-queried objects comprises a first type of a first relationship between a first to-be-queried object in each of the to-be-queried object sets and a second to-be-queried object in each of the to-be-queried object sets other than the first to-be-queried object, and wherein the method further comprises:
  determining whether the first to-be-queried object and the second to-be-queried object are connected by using the second relationship with a second type that belongs to a first preset field; and
  determining that the first preset field belongs to the query field when the first to-be-queried object and the second to-be-queried object are connected.

4. The method of claim 1, wherein each of the word segments corresponds to an object in the preset database, and wherein the method further comprises setting, as different to-be-queried objects in different to-be-queried object sets, different objects in the preset database that correspond to each of the word segments.

5. The method of claim 1, wherein after determining the query field, the method further comprises:
  sending, to a serving device corresponding to the query field, text information corresponding to any to-be-queried object set;
  receiving a query result from the serving device; and
  outputting the query result.

6. The method of claim 1, wherein performing word segmentation processing comprises invoking a string matching based word segmentation algorithm.

7. The method of claim 1, wherein performing word segmentation processing comprises invoking a forward maximum matching algorithm or a backward maximum matching algorithm.

8. The method of claim 1, wherein performing word segmentation processing comprises invoking a minimum-cut word segmentation algorithm or a bidirectional maximum matching algorithm.

9. The method of claim 1, wherein performing word segmentation processing comprises invoking an understanding based word segmentation algorithm.

10. The method of claim 1, wherein performing word segmentation processing comprises invoking a statistical based word segmentation algorithm.

11. A terminal comprising:
  a memory configured to store instructions; and
  one or more processors coupled to the memory, wherein when executed by the one or more processors, the instructions cause the terminal to:
  obtain a to-be-queried text;
  perform natural language understanding (NLU) processing on the to-be-queried text to obtain a target text;
  perform word segmentation processing on the target text to obtain a first word segment of the target text and a second word segment of the target text;
  determine, from a preset database, one or more to-be-queried object sets corresponding to the to-be-queried text, wherein each of the to-be-queried object sets comprises one or more to-be-queried objects, wherein the first word segment corresponds to a first object in the preset database, and wherein the second word segment does not correspond to an object in the preset database;
  determine, from preset relationship information, first relationship information of each of the to-be-queried objects in each of the to-be-queried object sets;
  determine second relationship information of the first object from the preset relationship information;
  determine, from the second relationship information, third relationship information that has a matching relationship with the second word segment;
  determine a target object based on the second object when the first object is connected to the second object based on the third relationship information in the preset database;
  set the target object as the to-be-queried object; and
  determine, based on the to-be-queried object, a query field corresponding to the to-be-queried text.

12. The terminal of claim 11, wherein each of the to-be-queried object sets comprises one to-be-queried object, wherein the second relationship information of the to-be-queried object comprises one or more types of relationships, and wherein when executed by the one or more processors, the instructions further cause the terminal to:
  determine whether a first type of a first relationship of the one to-be-queried object includes a second type that is of a second relationship and that belongs to a first preset field; and
  determine that the first preset field belongs to the query field when the first type includes the second type.

13. The terminal of claim 11, wherein each of the to-be-queried object sets comprises a plurality of to-be-queried objects, wherein the second relationship information of each of the to-be-queried objects comprises a first type of a first relationship between a first to-be-queried object in each of the to-be-queried object sets and a second to-be-queried object in each of the to-be-queried object sets other than the first to-be-queried object, and wherein when executed by the one or more processors, the instructions further cause the terminal to:
  determine whether all the first to-be-queried object and the second to-be-queried object are connected by using a second relationship with a second type that belongs to a first preset field; and
  determine that the first preset field belongs to the query field when the first to-be-queried object and the second to-be-queried object are connected.

14. The terminal of claim 11, wherein each of the word segments corresponds to an object in the preset database, and wherein when executed by the one or more processors, the instructions further cause the terminal to set, as different to-be-queried objects in different to-be-queried object sets, different objects in the preset database that correspond to each of the word segments.

15. The terminal of claim 11, wherein after determining the query field, when executed by the one or more processors, the instructions further cause the terminal to:
  send, to a serving device corresponding to the query field, text information corresponding to any to-be-queried object set;
  receive a query result from the serving device; and
  output the query result.

16. A computer program product comprising computer-executable instructions that are stored on a non-transitory computer-readable storage medium and that, when executed by one or more processors, cause an apparatus to:
  obtain a to-be-queried text;
  perform natural language understanding (NLU) processing on the to-be-queried text to obtain a target text;
  perform word segmentation processing on the target text to obtain a first word segment of the target text and a second word segment of the target text;
  determine, from a preset database, one or more to-be-queried object sets corresponding to the to-be-queried text, wherein each of the to-be-queried object sets comprises one or more to-be-queried objects, wherein the first word segment corresponds to a first object in the preset database, and wherein the second word segment does not correspond to an object in the preset database;

determine, from preset relationship information, first relationship information of each of the to-be-queried objects in each of the to-be-queried object sets;

determine second relationship information of the first object from the preset relationship information;

determine, from the second relationship information, third relationship information that has a matching relationship with the second word segment;

determine a target object based on the second object when the first object is connected to the second object based on the third relationship information in the preset database;

set the target object as the to-be-queried object; and determine, based on the to-be-queried object, a query field corresponding to the to-be-queried text.

17. The computer program product of claim 16, wherein each of the to-be-queried object sets comprises one to-be-queried object, wherein the second relationship information of the to-be-queried object comprises one or more types of relationships, and wherein the computer-executable instructions further cause the apparatus to:

determine whether a first type of a first relationship of the to-be-queried object includes a second type that is of a second relationship and that belongs to a first preset field; and determine that the first preset field belongs to the query field when the first type includes the second type.

18. The computer program product of claim 16, wherein each of the to-be-queried object sets comprises a plurality of to-be-queried objects, wherein the second relationship information of each of the to-be-queried objects comprises a first type of a first relationship between a first to-be-queried object in each of the to-be-queried object sets and a second to-be-queried object in each of the to-be-queried object sets other than the first to-be-queried object, and wherein the computer-executable instructions further cause the apparatus to:

determine whether all the first to-be-queried object and the second to-be-queried object are connected using a second relationship with a second type that belongs to a first preset field; and determine that the first preset field belongs to the query field when the first to-be-queried object and the second to-be-queried object are connected.

19. The computer program product of claim 16, wherein each of the word segments corresponds to an object in the preset database, and wherein the computer-executable instructions further cause the apparatus to set, as different to-be-queried objects in different to-be-queried object sets, different objects in the preset database that correspond to each of the word segments.

20. The computer program product of claim 16, wherein after determining the query field, the computer-executable instructions further cause the apparatus to:

send, to a serving device corresponding to the query field, text information corresponding to any to-be-queried object set;

receive a query result from the serving device; and output the query result.

* * * * *